United States Patent
Lin et al.

(10) Patent No.: US 11,558,140 B2
(45) Date of Patent: Jan. 17, 2023

(54) INTELLIGENCE-DEFINED OPTICAL TUNNEL NETWORK SYSTEM

(71) Applicant: DELTA ELECTRONICS, INC., Taoyuan (TW)

(72) Inventors: Tien-Chien Lin, Taoyuan (TW); Tzu-Hao Huang, Taoyuan (TW); Maria Chi-Jui Yuang, Hsinchu (TW); Po-Lung Tien, Hsinchu (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/246,011

(22) Filed: Apr. 30, 2021

(65) Prior Publication Data

US 2021/0266089 A1  Aug. 26, 2021

Related U.S. Application Data

(63) Continuation-in-part of application No. 16/399,591, filed on Apr. 30, 2019, now Pat. No. 11,012,175.
(Continued)

(30) Foreign Application Priority Data

Feb. 27, 2019 (CN) .......................... 201910146785.6

(51) Int. Cl.
*H04J 14/02* (2006.01)
(52) U.S. Cl.
CPC ...... *H04J 14/0219* (2013.01); *H04J 14/0212* (2013.01)
(58) Field of Classification Search
CPC .......................... H04J 14/0219; H04J 14/0212
See application file for complete search history.

(56) References Cited

U.S. PATENT DOCUMENTS 6,307,986 B1  10/2001  Duerksen et al.
9,225,454 B1  12/2015  Liu et al.
(Continued)

FOREIGN PATENT DOCUMENTS

CN   102638411   8/2012
CN   105099556   11/2015
(Continued)

OTHER PUBLICATIONS

M. C. Yuang et al., "OPTUNS: Optical intra-data center network architecture and prototype testbed for a 5G edge cloud [Invited]," Journal of Optical Communication and Networking, vol. 12, No. 1, pp. A28-A37, 2020.
(Continued)

*Primary Examiner* — Casey L Kretzer
(74) *Attorney, Agent, or Firm* — Hauptman Ham, LLP

(57) ABSTRACT

An intelligence-defined optical tunnel network system includes pods. Each pod includes optical add-drop sub-systems. Each optical add-drop sub-system includes a first transmission module and a second transmission module. The first transmission modules of the optical add-drop sub-systems are connected to each other for forming a first transmission ring. The second transmission modules of the optical add-drop sub-systems are connected to each other for forming a second transmission ring. Each first transmission module includes a multiplexer and an optical signal amplifier. The multiplexer is connected to a Top-of-Rack switch. The multiplexer is configured to receive, through input ports, upstream optical signals from the Top-of-Rack switch, and combine the upstream optical signals into a composite optical signal. The upstream optical signals have wavelengths respectively. The optical signal amplifier, coupled to the multiplexer, is configured to amplify the composite
(Continued)

optical signal and output an amplified composite optical signal.

15 Claims, 8 Drawing Sheets

Related U.S. Application Data

(60) Provisional application No. 62/683,037, filed on Jun. 11, 2018.

(56) References Cited

U.S. PATENT DOCUMENTS

| | | | |
|---|---|---|---|
| 9,807,477 | B2 | 10/2017 | Yuang et al. |
| 10,615,902 | B2 | 4/2020 | Tien et al. |
| 2004/0131354 | A1 | 7/2004 | Kim et al. |
| 2004/0208575 | A1 | 10/2004 | Kinoshita et al. |
| 2005/0180752 | A1 | 8/2005 | Nakagawa |
| 2014/0270761 | A1 | 9/2014 | Xu et al. |
| 2015/0181317 | A1 | 6/2015 | Yin et al. |
| 2016/0277816 | A1 | 9/2016 | Yuang et al. |
| 2018/0098138 | A1 | 4/2018 | Frankel et al. |

FOREIGN PATENT DOCUMENTS

| | | |
|---|---|---|
| CN | 106877970 | 7/2019 |
| EP | 3582507 A1 | 12/2019 |
| JP | 2019216416 | 12/2019 |
| TW | 201635733 | 10/2016 |
| TW | I552536 | 10/2016 |
| TW | I690175 | 4/2020 |
| TW | I690176 | 4/2020 |

OTHER PUBLICATIONS

Bakapoulos Parskevas et al., "NEPHELE: An End-to-End Scalable and Dynamically Reconfigurable Optical Architecture for Application-Aware SDN Cloud Data Centers," IEEE Communications Magazine, Feb. 2018 (Feb. 1, 2018), pp. 178-188.

Kamchevska Valerija et al., "Experimental demonstration of multidimensional switching nodes for all-optical data centre networks," 2015 European Conference on Optical Communication (ECOC), Viajes El Corte Ingles, Vecisa, Sep. 27, 2015 (Sep. 27, 2015), pp. 1-3, XP032820209, DOI: 10.1109/ECOC.2015.7341907.

Yuang Maria et al., "OPTUNS: Optical Edge Datacenter Network Architecture and Prototype Testbed for Supporting 5G," 2019 Optical Fiber Communications Conference and Exhibition (OFC), OSA, Mar. 3, 2019 (Mar. 3, 2019), pp. 1-3, XP033540599.

Cisco Data Center Spine-and-Leaf Architecture: Design Overview White Paper (2016). All pages. [Online]. Available: https://www.cisco.com/c/en/us/products/collateral/switches/nexus-7000-series-switches/white-paper-c11-737022.html.

Y. Yin, R. Proietti, X. Ye, C. Nitta, V. Akella, and S. Yoo, "LIONS: An AWGR-based low-latency optical switch for high-performance computing and data centers," IEEE J. Sel. Topics Quantum Electron., vol. 19, No. 2, Mar./Apr. 2013.

M. C. Yuang et al., "OPMDC: Architecture Design and Implementation of a New Optical Pyramid Data Center Network," Journal of Lightwave Technology, vol. 33, No. 10, pp. 2019-2031, 2015.

Huber+suhner. Optical switch 7000 series. (2018). All pages. [Online]. Available: https://www.hubersuhner.com/en/solutions/wan-access-network/products/optical-switches/optical-switch-7000-series.

Francesco Testa and Lorenzo Pavesi (Editors), "Optical Switching in Next Generation Data Centers," New York, NW, USA: Springer, 2018, all pages.

INTELLIGENCE-DEFINED OPTICAL TUNNEL NETWORK SYSTEM

RELATED APPLICATIONS

This application is a Continuation-in-part of U.S. application Ser. No. 16/399,591, filed on Apr. 30, 2019, which claims priority of U.S. Provisional Application Ser. No. 62/683,037, filed on Jun. 11, 2018, and China Application Serial Number 201910146785.6, filed on Feb. 27, 2019, and the entirety of which are incorporated by reference herein in their entireties.

BACKGROUND

Data Center Networks (DCNs) are utilized in cloud data centers or edge data centers to provide a reliable and efficient network structure, which is able to support various applications and services which are cloud-based, edge-based or enterprise-orientated, such as cloud computing, edge computing, data storage, data mining, social networking, etc.

In a Data Center Network utilizing conventional electrical switches for data exchanging, a transmission rate of the Data Center Network will be limited by data exchanging capability of the conventional electronic switches. In addition, the process of data transmission in the Data Center Network involves a lot of Optical-Electrical conversions and Electrical-Optical conversions, which will cause heavy power consumption. The conventional electronic switches also require a lot of computation to determine how to route packets during the data transmission. The computation performed by the conventional electronic switches consumes a lot of power, increase latency of data transmission and raise a cost to cool down the Data Center Network system. Furthermore, when a system structure of the conventional electronic switches is formed and fixed, it is difficult to upgrade the system structure in order to support more racks or servers with higher performance. In order to increase a transmission rate of the Data Center Network utilizing the conventional electronic switches, the existed electronic switches are required to be replaced or upgraded, such that it causes a higher cost to establish or maintain the Data Center Network utilizing the conventional electronic switches.

SUMMARY

The disclosure provides an intelligence-defined optical tunnel network system which includes a plurality of pods. Each one of the pods comprises a plurality of optical add-drop sub-systems. Each one of the optical add-drop sub-systems comprises a first transmission module and a second transmission module. The first transmission modules of the optical add-drop sub-systems are connected to each other for forming a first transmission ring. The second transmission modules of the optical add-drop sub-systems are connected to each other for forming a second transmission ring. Each one of the first transmission module includes a multiplexer and a first optical signal amplifier. The multiplexer is connected to a Top-of-Rack switch. The multiplexer is configured to receive, through a plurality of input ports, a plurality of upstream optical signals from the Top-of-Rack switch, and combine the upstream optical signals into a composite optical signal. The upstream optical signals have a plurality of wavelengths respectively. The first optical signal amplifier is coupled to the multiplexer. The first optical signal amplifier is configured to amplify the composite optical signal and output an amplified composite optical signal.

The disclosure further provides an intelligence-defined optical tunnel network system which includes a plurality of pods. Each one of the pods includes a plurality of optical add-drop sub-systems. Each one of the optical add-drop sub-systems includes a first transmission module and a second transmission module. The first transmission modules of the optical add-drop sub-systems are connected to each other for forming a first transmission ring. The second transmission modules of the optical add-drop sub-systems are connected to each other for forming a second transmission ring. Each one of the first transmission module includes a multiplexer, a first splitter, and a first optical signal amplifier. The multiplexer is connected to a Top-of-Rack switch. The multiplexer is configured to receive, through a plurality of input ports, a plurality of upstream optical signals from the Top-of-Rack switch, and combine the upstream optical signals into a composite optical signal. A first output terminal of the multiplexer is configured to transmit the composite optical signal through a first longitudinal port to a first optical switch interconnect sub-system. A second output terminal of the multiplexer is configured to output the composite optical signal. The first splitter is disposed on the first transmission ring and coupled to the second output terminal of the multiplexer. The first splitter is configured to receive the composite optical signal from the second output terminal of the multiplexer and transmit a first lateral transmission optical signal through the first transmission ring. The first optical signal amplifier is disposed on the first transmission ring and coupled to the first splitter. The first optical signal amplifier is configured to amplify the first lateral transmission optical signal and output the amplified first lateral transmission optical signal to the first transmission module of another optical add-drop sub-system in the same pod.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
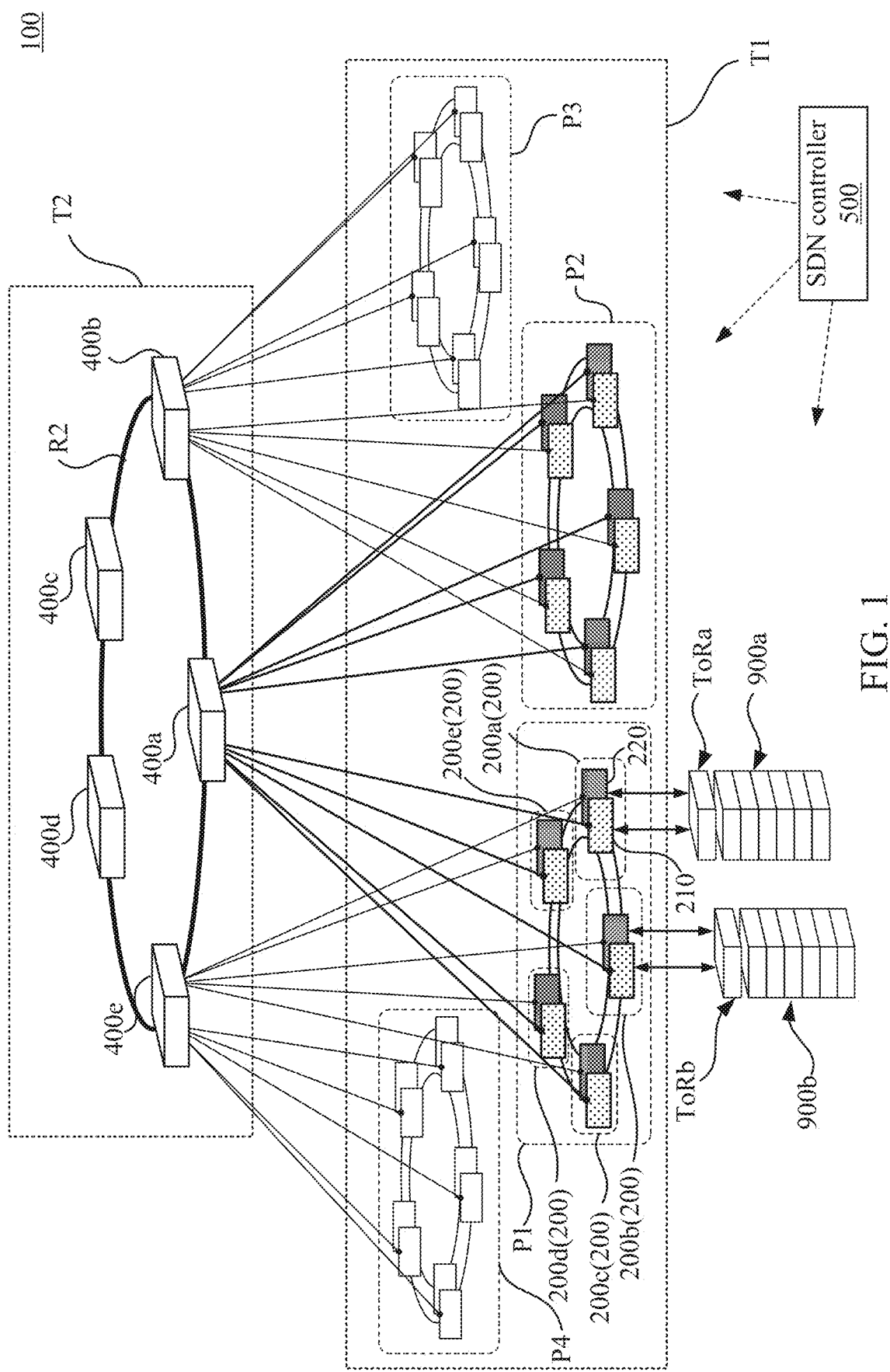
FIG. 1 is a schematic diagram of an intelligence-defined optical tunnel network system in accordance with some embodiments of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

The terms "comprise," "comprising," "include," "including," "has," "having," etc. used in this specification are open-ended and mean "comprises but not limited." As used herein, the term "and/or" includes any and all combinations of one or more of the associated listed items.

In this document, the term "coupled" may also be termed "electrically coupled" and "coupled by optical fiber", and the term "connected" may be termed "electrically connected" and "connected by optical fiber". "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. In this disclosure, mentioned terms 1×1,1×2,1×3,2× 1,2×2,5×1,6×4 and N×M illustrate the amount of input terminals and the amount of output terminals such as 1 input and 1 output, 1 input and 2 outputs, 1 input and 3 outputs, 2 inputs and 1 output, 2 inputs and 2 outputs, 5 inputs and 1 output, 6 inputs and 4 outputs, and N inputs and M outputs respectively.

Please refer to FIG. 1. FIG. 1 is a schematic diagram of an intelligence-defined optical tunnel network system 100 in accordance with some embodiments of the present disclosure. In some embodiments, the intelligence-defined optical tunnel network system 100 can be applied to the intelligence-defined optical tunnel network system (OPTUNS) in the Edge Data Center for replacing the complicated, multi-tier and electrically-switching network system in the data center.

As shown in FIG. 1, in some embodiments, the intelligence-defined optical tunnel network system 100 includes a first tier network T1 and a second tier network T2. The first tier network T1 and the second tier network T2 can be interconnected by a single mode fiber. In some embodiments, the first tier network T1 and the second tier network T2 are optical switching networks.

As shown in FIG. 1, in some embodiments, the first tier network T1 includes a plurality of pods, such as the pods P1-P4. In the embodiment shown in FIG. 1, the pods P1-P4 are pods of optical nodes. For ease of understanding and simplifying the description, a pod of the first tier network T1 is not shown in FIG. 1.

Each of the pods P1-P4 in the first tier network T1 includes a plurality of optical add-drop sub-systems (hereinafter OADSs) 200 as optical nodes. OADSs 200 are configured to transmit data through a plurality of Top-of-Rack switches (such as Top-of-Rack switches ToRa and ToRb) with servers in a plurality of racks (such as racks 900a and 900b). As shown in FIG. 1, in some embodiments, each of the pods P1-P4 includes five OADSs. For the ease of description, only two sets of Top-of-Rack switches and racks (i.e., ToRa and 900a, and ToRb and 900b) are illustrated in FIG. 1.

In practice, all OADSs 200 are connected to their corresponding servers through the corresponding Top-of-Rack switches in order to perform data transmission. Further, the amount of OADSs 200 included in each of the pods P1-P4 can be adjusted according to the actual need. FIG. 1 is merely exemplary and does not limit the present disclosure.

Each of the OADSs 200 in the pods P1-P4 includes at least two transmission modules. Take the OADS 200a as an example. The OADS 200a includes a first transmission module 210 and a second transmission module 220. The first transmission module 210 is configured to perform data transmission through a set of wavelengths within a first wavelength group. The second transmission module 220 is configured to perform data transmission through a set of wavelengths within a second wavelength group which differs from the first wavelength group. In some embodiments, the first transmission module 210 and the second transmission module 220 are optical transmission modules. As shown in FIG. 1, each first transmission module 210 of the OADSs in the same pod is connected to the first transmission modules 210 of the adjacent OADSs in the same pod, so that a first transmission ring is formed. For example, in the pod P1, the first transmission module 210 of the OADS 200a is connected to the first transmission module 210 of the OADS 200b and the first transmission module 210 of the OADS 200e. Similarly, each second transmission module 220 of the OADSs in the same pod is connected to the second transmission modules 220 of the adjacent the OADSs in the same pod, so that a second transmission ring is formed. In some embodiments, the first transmission modules 210 in the first transmission ring are connected to each other through an optical fiber, and the second transmission modules 220 in the second transmission ring are connected to each other through an optical fiber.

As shown in FIG. 1, in some embodiments, the second tier network T2 comprises a plurality of optical switch interconnect sub-systems (hereinafter OSISs) 400a-400e as optical nodes. Structurally, any two of the OSISs 400a-400e transmits a corresponding lateral transmission optical signal through the corresponding first line to implement communication between each of the OSISs 400a-400e. In other words, the OSISs 400a-400e are interconnected to each other with optical fiber in a structure which is similar to the mesh network, so that the fiber network between any pair of OSISs 400a-400e and the fiber network between any other pair of the OSISs 400a-400e operate independently to each other. In some embodiments, the optical fiber network between the OSISs 400a-400e can be implemented with ribbon fiber. Therefore, the connection between the OSISs 400a-400e also appears to be a ring-shaped mesh structure R2 in outward expression.

The OSISs 400a-400e are configured to receive, respectively, optical signals from the OADS of the first tier network T1, after performing route switching and optical wavelength switching transit downwardly to another OADS of the first tier network T1.

A Software-defined network controller (SDN controller) 500 is configured to output corresponding control signals to each of the Top-of-Rack switches ToRa, ToRb, the OADSs 200a-200e and the OSISs 400a-400e in order to build optical tunnels and schedule the optical tunnels. Thus, the data transmission in the system between each server can be implemented by utilizing optical signals through the optical fiber networks in the first tier network T1 and the second tier network T2.

It should be noted that the amounts of OSISs and of OADSs illustrated in FIG. 1 are merely exemplary and the present disclosure is not limited thereto. In various embodiments, the amount of OSISs 400a-400e and OADSs 200a-200e of the intelligence-defined optical tunnel network system 100 can be incrementally increased and/or decreased in accordance with the actual requirement and the normal operation of the intelligence-defined optical tunnel network system 100 is maintained. Therefore, the intelligence-defined optical tunnel network system 100 has a high degree of deployment flexibility.

As a result, in the intelligence-defined optical tunnel network system 100, by selecting a particular wavelength combination of the OSISs 400a-400e, the OADSs 200a-200e and the optical signals, the optical tunnel (that is, the optical path pluses optical wavelength combination) for data exchange between racks and racks can be established to achieve an ultra-low latency of data transmission.

In addition, in some embodiments, the dense wavelength division multiplexing (DWDM) technology can be applied in the intelligence-defined optical tunnel network system 100. By utilizing DWDM transceiver, various optical wavelengths can be used for transmitting data at the same time in the intelligence-defined optical tunnel network system 100. However, intelligence-defined optical tunnel network system 100 in the present disclosure is not limited to DWDM technology. The intelligence-defined optical tunnel network system 100 may also be implemented with other wavelength division multiplexing (WDM) or other equivalent multiplexed optical transmission technology. In this way, the intelligence-defined optical tunnel network system 100 can achieve low latency, high bandwidth, low power consumption, and has better performance than the electrically switching network system used in the existing data center.

Figure 2:
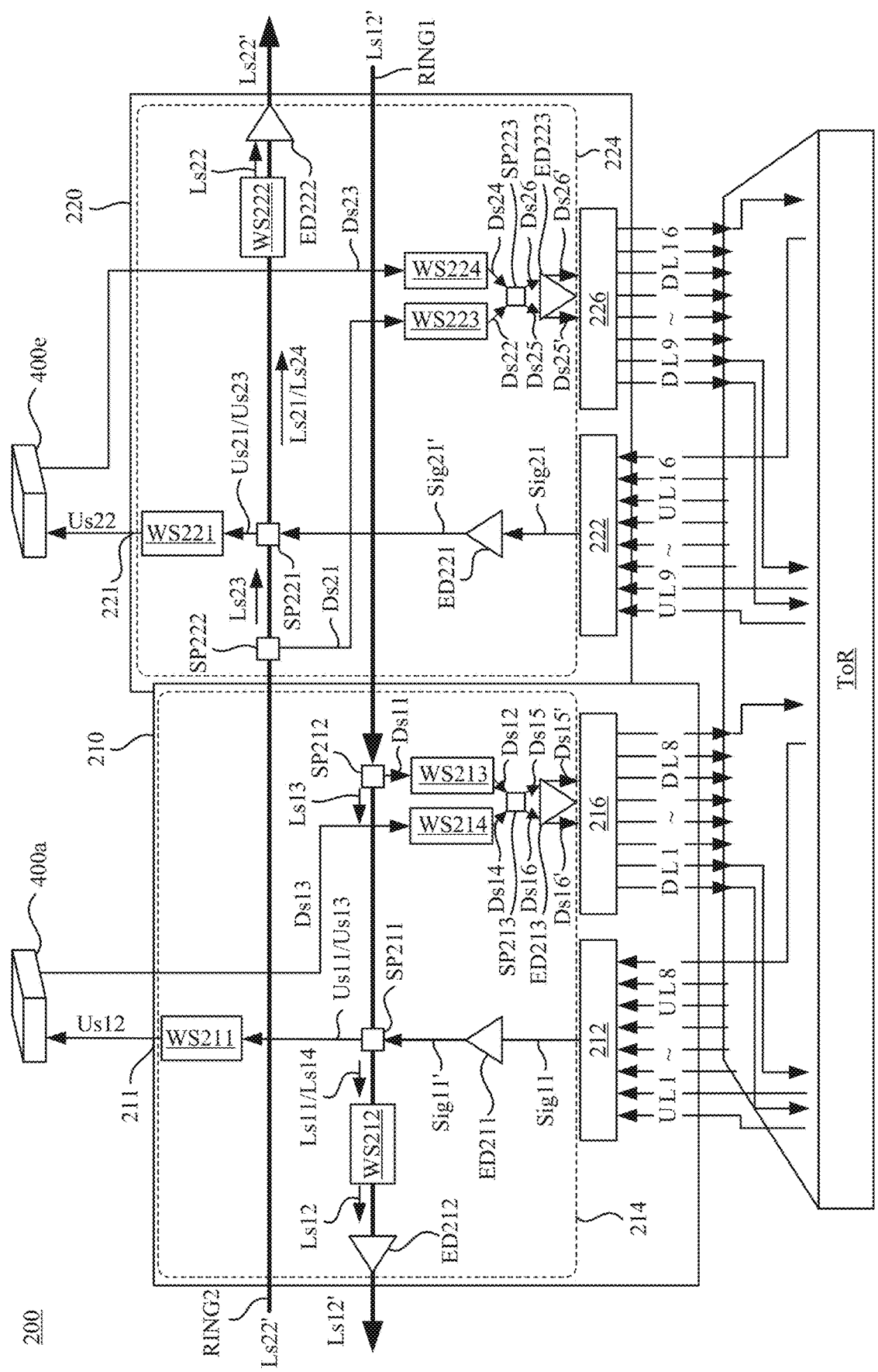
FIG. 2 is a schematic diagram of an optical add-drop sub-system (OADS) in accordance with some embodiments of the present disclosure.

The following paragraphs are the descriptions of the OADSs 200a-200e accompanied with relevant diagrams. Please refer to FIG. 2. FIG. 2 is a schematic diagram of the OADS 200 in accordance with some embodiments of the present disclosure. The OADS 200 is a core switch node for building optical tunnels between the racks of the first tier network T1 for data transmission. As shown in FIG. 2, the OADS 200 includes two or more independent transmission modules, such as a first transmission module 210 and a second transmission module 220.

As shown in FIG. 2, both the first transmission module 210 and the second transmission module 220 include the multiplexers 212 and 222 as input sub-modules, include the switching sub-modules 214 and 224, and include the demultiplexers 216 and 226 as output sub-modules. Specifically, the switching sub-module 214 in the first transmission module 210 includes a first optical signal amplifier ED211, a first splitter SP211, a first wavelength selective switch WS211, a second wavelength selective switch WS212, a second optical signal amplifier ED212, a second splitter SP212, a third wavelength selective switch WS213, a fourth wavelength selective switch WS214, a third splitter SP213, and a third optical signal amplifier ED213. Similarly, the switching sub-module 224 in the second transmission module 220 includes a first optical signal amplifier ED221, a first splitter SP221, a first wavelength selective switch WS221, a second wavelength selective switch WS222, a second optical signal amplifier ED222, a second splitter SP222, a third wavelength selective switch WS223, a fourth wavelength selective switch WS224, a third splitter SP223, and a third optical signal amplifier ED223.

The multiplexer 212 connected to a Top-of-Rack switch ToR is configured to receive, through a plurality of input ports, a plurality of upstream optical signals UL1-UL8 from the Top-of-Rack switch ToR, and combine the upstream optical signals UL1-UL8 into a composite optical signal Sig11, wherein each of the upstream optical signals UL1-UL8 has its own wavelength. The first optical signal amplifier ED211 is coupled to the multiplexer 212 and configured to amplify the composite optical signal Sig11 and output an amplified composite optical signal Sig11'. The first splitter SP211 is disposed on the first transmission ring RING1 and coupled to the first optical signal amplifier ED211. The first splitter SP211 is configured to receive and duplicate the amplified composite optical signal Sig11' as a first lateral transmission optical signal Ls11 and as a first uplink transmission optical signal Us11, transmit the first lateral transmission optical signal Ls11 through the first transmission ring RING1, and output the first uplink transmission optical signal Us11. The first wavelength selective switch WS211 is coupled to the first splitter SP211. The first wavelength selective switch WS211 is configured to receive the first uplink transmission optical signal Us11 from the first splitter SP211 and transmit a second uplink transmission optical signal Us12 through a first longitudinal port 211 to the OSIS 400a. The second wavelength selective switch WS212 is disposed on the first transmission ring RING1 and coupled to the first splitter SP211. The second wavelength selective switch WS212 is configured to receive the first lateral transmission optical signal Ls11 from the first splitter SP211 and output a second lateral transmission optical signal Ls12. The second optical signal amplifier ED212 is disposed on the first transmission ring RING1 and coupled to the second wavelength selective switch WS212. The second optical signal amplifier ED212 is configured to receive and amplify the second lateral transmission optical signal Ls12 and output an amplified second lateral transmission optical signal Ls12' to the first transmission module 210 of another OADS 200 in the same pod.

The second splitter SP212 is disposed on the first transmission ring RING1. The second splitter SP212 is configured to receive and duplicate the amplified second lateral transmission optical signal Ls12' received from the first transmission module 210 of another OADS 200 in the same pod as a first downlink transmission optical signal Ds11 and as a third lateral transmission optical signal Ls13, and transmit the third lateral transmission optical signal Ls13 to the first splitter SP211. The third wavelength selective switch WS213 is coupled to the second splitter SP212. The third wavelength selective switch WS213 is configured to receive the first downlink transmission optical signal Ds11 from the second splitter SP212 and output a second downlink transmission optical signal Ds12. The fourth wavelength selective switch WS214 is configured to receive a third downlink transmission optical signal Ds13 from the OSIS 400a and output a fourth downlink transmission optical signal Ds14. The third splitter SP213 is coupled to the third wavelength selective switch WS213 and the fourth wavelength selective switch WS214. The third splitter SP213 is configured to receive the second downlink transmission optical signal Ds12 from the third wavelength selective switch WS213, receive the fourth downlink transmission optical signal Ds14 from the fourth wavelength selective switch WS214, combine the second downlink transmission optical signal Ds12 and the fourth downlink transmission optical signal Ds14 as a fifth downlink transmission optical signal Ds15, combine the second downlink transmission optical signal Ds12 and the fourth downlink transmission optical signal Ds14 as the sixth downlink transmission optical signal Ds16, and output the fifth downlink transmission optical signal Ds15 and the sixth downlink transmission optical signal Ds16. The third optical signal amplifier ED213 is coupled to the third splitter SP213. The third optical signal amplifier ED213 is configured to receive the fifth downlink transmission optical signal Ds15 and the sixth downlink transmission optical signal Ds16, amplify the fifth downlink transmission optical signal Ds15 and the sixth downlink transmission optical signal Ds16, and output an amplified fifth downlink transmission optical signal Ds15' and the amplified sixth downlink transmission optical signal Ds16'. The demultiplexer 216 is coupled to the third optical signal amplifier ED213 and connected to the Top-of-Rack switch ToR. The demultiplexer 216 is configured to receive and demultiplex the amplified fifth downlink transmission optical signal Ds15' and the amplified sixth downlink transmission optical signal Ds16' as a plurality of downstream optical signals DL1-DL8, and transmit the downstream optical signals DL1-DL8 to the Top-of-Rack switch ToR.

As to the components included in the switching sub-module 224 of the second transmission module 220, their function and operation can be referred to their counterparts in the switching sub-module 214. The function and operation of the multiplexer 222 of the second transmission module 220 can be referred to the multiplexer 212 of the first transmission module 210 in the following embodiment. The function and operation of first optical signal amplifier ED221 of the switching sub-module 224 can be referred to the first optical signal amplifier ED211 of the switching sub-module 214 in the following embodiment. The function and operation of the first splitter SP221 of the switching sub-module 224 can be referred to the first splitter SP211 of the switching sub-module 214 in the following embodiment. The function and operation of the first wavelength selective switch WS221 of the switching sub-module 224 can be referred to the first wavelength selective switch WS211 of the switching sub-module 214 in the following embodiment. The function and operation of the second wavelength selective switch WS222 of the switching sub-module 224 can be referred to the second wavelength selective switch WS212 of the switching sub-module 214 in the following embodiment. The function and operation of the second optical signal amplifier ED222 of the switching sub-module 224 can be referred to the second optical signal amplifier ED212 of the switching sub-module 214 in the following embodiment. The function and operation of the second splitter SP222 of the switching sub-module 224 can be referred to the second splitter SP212 of the switching sub-module 214 in the following embodiment. The function and operation of the third wavelength selective switch WS223 of the switching sub-module 224 can be referred to the third wavelength selective switch WS213 of the switching sub-module 214 in the following embodiment. The function and operation of the fourth wavelength selective switch WS224 of the switching sub-module 224 can be referred to the fourth wavelength selective switch WS214 of the switching sub-module 214 in the following embodiment. The function and operation of the third splitter SP223 of the switching sub-module 224 can be referred to the third splitter SP213 of the switching sub-module 214 in the following embodiment. The function and operation of the third optical signal amplifier ED223 of the switching sub-module 224 can be referred to the third optical signal amplifier ED213 of the switching sub-module 214 in the following embodiment. The function and operation of the demultiplexer 226 of the second transmission module 220 can be referred to the demultiplexer 216 of the first transmission module 210 in the following embodiment.

Each input port of the multiplexers 212 and 222 is coupled, through optical fiber, to a transmitter of the various DWDM transceivers on an uplink port of Top-of-Rack switch in the rack.

The main function of the switching sub-modules 214 and 224 is to successively upload the composite optical signals Sig11 and Sig21 transmitted from the input sub-module (i.e., the multiplexers 212 and 222) to the OSISs 400a and 400e in the second tier network T2, or transmit, to East or West, to the other OADSs 200 in the same pod, and switch the optical signals transmitted from the other OADSs 200 in the same pod to the receiving sub-modules 216 and 226. For example, in FIG. 1, the OADSs in the pod P2 can transmit the optical signals to the other four OADSs in the pod P2 and receive the optical signals from the other four OADSs in the pod P2. Likewise, the OADSs in each pod in FIG. 1 can transmit the optical signals to the other four OADSs in the same pod and receive the optical signals from the other four OADSs in the same pod.

Below are the detailed descriptions of the OADS 200. For the purpose of brevity, in the following paragraphs, the first transmission module 210 of the OADS 200 will be used as an example to describe the operation of the components in the OADS 200. The components in the second transmission module 220 and their operation are similar to their counterparts in the first transmission module 210.

As shown in FIG. 2, structurally, the first optical signal amplifier ED211 is coupled to the multiplexer 212 and the first splitter SP211. The first optical signal amplifier ED211 is configured to amplify the composite optical signal Sig11 and output the amplified composite optical signal Sig11' to the first splitter SP211. In some embodiments, the first optical signal amplifier ED211 can be implemented as an erbium-doped fiber amplifier (EDFA).

As shown in FIG. 2, structurally, the first splitter SP211 is disposed on the first transmission ring RING1 and coupled to the first optical signal amplifier ED211, the first wavelength selective switch WS211, the second wavelength selective switch WS212, and the second splitter SP212. The first splitter SP211 is configured to receive and duplicate the amplified composite optical signal Sig11' as the first lateral transmission optical signal Ls11 and as the first uplink transmission optical signal Us11, transmit the first lateral transmission optical signal Ls11 through the first transmission ring RING1 to the second wavelength selective switch WS212, and output the first uplink transmission optical signal Us11 to the first wavelength selective switch WS211.

As shown in FIG. 2, structurally, the first wavelength selective switch WS211 is coupled to the first splitter SP211 and the OSIS 400a. The first wavelength selective switch WS211 is configured to receive the first uplink transmission optical signal Us11 from the first splitter SP211 and transmit the second uplink transmission optical signal Us12 through a first longitudinal port 211 to the OSIS 400a.

Specifically, the first wavelength selective switch WS211 is a 1×1 (1 input port and 1 output port) wavelength selective switch which allows only signals with specific wavelength to pass through.

As shown in FIG. 2, structurally, the second wavelength selective switch WS212 is disposed on the first transmission ring RING1 and coupled to the first splitter SP211 and the second optical signal amplifier ED212. The second wavelength selective switch WS212 is configured to receive the first lateral transmission optical signal Ls11 from the first splitter SP211 and output the second lateral transmission optical signal Ls12 to the second optical signal amplifier ED212.

Specifically, the second wavelength selective switch WS212 is a 1×1 (1 input port and 1 output port) wavelength selective switch which allows only signals with specific wavelength to pass through.

As shown in FIG. 2, structurally, the second optical signal amplifier ED212 is disposed on the first transmission ring RING1 and coupled to the second wavelength selective switch WS212 and the second splitter SP212 of another OADS 200. The second optical signal amplifier ED212 is configured to receive the second lateral transmission optical signal Ls12 from the second wavelength selective switch WS212, amplify the second lateral transmission optical signal Ls12, and output the amplified second lateral transmission optical signal Ls12' to the first transmission module 210 of another optical add-drop sub-system 200 in the same pod. In other words, in the embodiment shown in FIG. 2, the optical signal amplifier ED212 amplifies the power of the optical signal which is being transmitted to the West to ensure that the optical signal has sufficient power to reach its destination. It is worth noting that the present disclosure does not limit the direction of transmission to the West. In actual applications, the transmission direction can be adjusted according to the network configuration. In some embodiments, the second optical signal amplifier ED212 can be implemented as an erbium-doped fiber amplifier (EDFA).

As shown in FIG. 2, structurally, the second splitter SP212 is disposed on the first transmission ring RING1 and is coupled to the third wavelength selective switch WS213, the first splitter SP211, and the second optical signal amplifier ED212 of another OADS 200. The second splitter SP212 is configured to receive and duplicate the amplified second lateral transmission optical signal Ls12' received from the first transmission module 210 of another OADS 200 in the same pod as the first downlink transmission optical signal Ds11 and as the third lateral transmission optical signal Ls13, transmit the first down link transmission optical signal Ds11 to the third wavelength selective switch WS213, and transmit the third lateral transmission optical signal Ls13 through the first transmission ring RING1 to the first splitter SP211.

Specifically, the second splitter SP212 is a 1×2 (1 input port and 2 output ports) splitter which duplicates and splits the amplified second lateral transmission optical signal Ls12' into two beams. In the embodiment shown in FIG. 2, one of the two beams continually transmits to the West to other OADSs in the same pod, and the other of the two beams transmits downwardly to the optical receiving module (i.e., the demultiplexer 216). It is worth noting that the present disclosure does not limit the direction of transmission to the West. In actual applications, the transmission direction can be adjusted according to the network configuration.

As shown in FIG. 2, structurally, the third wavelength selective switch WS213 is coupled to the second splitter SP212 and the third splitter SP213. The third wavelength selective switch WS213 is configured to receive the first downlink transmission optical signal Ds11 from the second splitter SP212 and output the second downlink transmission optical signal Ds12 to the third splitter SP213.

Specifically, the third wavelength selective switch WS213 is a 1×1 (1 input port and 1 output port) wavelength selective switch which allows only signals with specific wavelength to pass through.

As shown in FIG. 2, structurally, the fourth wavelength selective switch WS214 is coupled to the OSIS 400a and the third splitter SP213. The fourth wavelength selective switch WS214 is configured to receive the third downlink transmission optical signal Ds13 from the OSIS 400a and output the fourth downlink transmission optical signal Ds14 to the third splitter SP213.

Specifically, the fourth wavelength selective switch WS214 is a 1×1 (1 input port and 1 output port) wavelength selective switch which allows only signals with specific wavelength to pass through.

As shown in FIG. 2, structurally, the third splitter SP213 is coupled to the third wavelength selective switch WS213, the fourth wavelength selective switch WS214, and the third optical signal amplifier ED213. The third splitter SP213 is configured to receive the second downlink transmission optical signal Ds12 from the third wavelength selective switch WS213, receive the fourth downlink transmission optical signal Ds14 from the fourth wavelength selective switch WS214, combine the second downlink transmission optical signal Ds12 and the fourth downlink transmission optical signal Ds14 as the fifth downlink transmission optical signal Ds15, combine the second downlink transmission optical signal Ds12 and the fourth downlink transmission optical signal Ds14 as the sixth downlink transmission optical signal Ds16, and transmit the fifth downlink transmission optical signal Ds15 and the sixth downlink transmission optical signal Ds16 to the third optical signal amplifier ED213. Therefore, a 2×2 (2 input ports and 2 output ports) wavelength selective switch is implemented through the combination of the third wavelength selective switch WS213, the fourth wavelength selective switch WS214, and the third splitter SP213.

As shown in FIG. 2, structurally, the third optical signal amplifier ED213 is coupled to the third splitter SP213 and the demultiplexer 216. The third optical signal amplifier ED213 is configured to receive the fifth downlink transmission optical signal Ds15 and the sixth downlink transmission optical signal Ds16 from the third splitter SP213, amplify the fifth downlink transmission optical signal Ds15 and the sixth downlink transmission optical signal Ds16, and output the amplified fifth downlink transmission optical signal Ds15' and the amplified sixth downlink transmission optical signal Ds16' to the demultiplexer 216.

As shown in FIG. 2, structurally, the demultiplexer 216 is coupled to the third optical signal amplifier ED213 and connected to the Top-of-Rack switch ToR. The demultiplexer 216 is configured to receive the amplified fifth downlink transmission optical signal Ds15' and the amplified sixth downlink transmission optical signal Ds16' from the third optical signal amplifier ED213, demultiplex the amplified fifth downlink transmission optical signal Ds15' and the amplified sixth downlink transmission optical signal Ds16' as a plurality of downstream optical signals DL1-DL8, and transmit the downstream optical signals DL1-DL8 to the Top-of-Rack switch ToR.

In addition, in some embodiments, the first splitter SP211 is further configured to receive the third lateral transmission optical signal Ls13 from the second splitter SP212, duplicate the third lateral transmission optical signal Ls13 as a fourth lateral transmission optical signal Ls14 and as a third uplink transmission optical signal Us13, transmit the fourth lateral transmission optical signal Ls14 through the first transmission ring RING1, and transmit the third uplink transmission optical signal Us13 through the first longitudinal port 211 to the OSIS 400a.

Specifically, the first splitter SP211 is a 2×2 (2 input port ports and 2 output port ports) splitter. One of its two input ports is configured to receive the composite optical signal Sig11 from the first optical signal amplifier ED211, and the other one of the input ports is configured to receive the third lateral transmission optical signal Ls13 from the second splitter SP212. One of its two output ports is to output the first lateral transmission optical signal Ls11 or the fourth lateral transmission optical signal Ls14 to the second wavelength selective switch WS212, and the other of the output ports is to output the first uplink transmission optical signal Us11 or the third uplink transmission optical signal Us13 to the first wavelength selective switch WS211.

Figure 3:
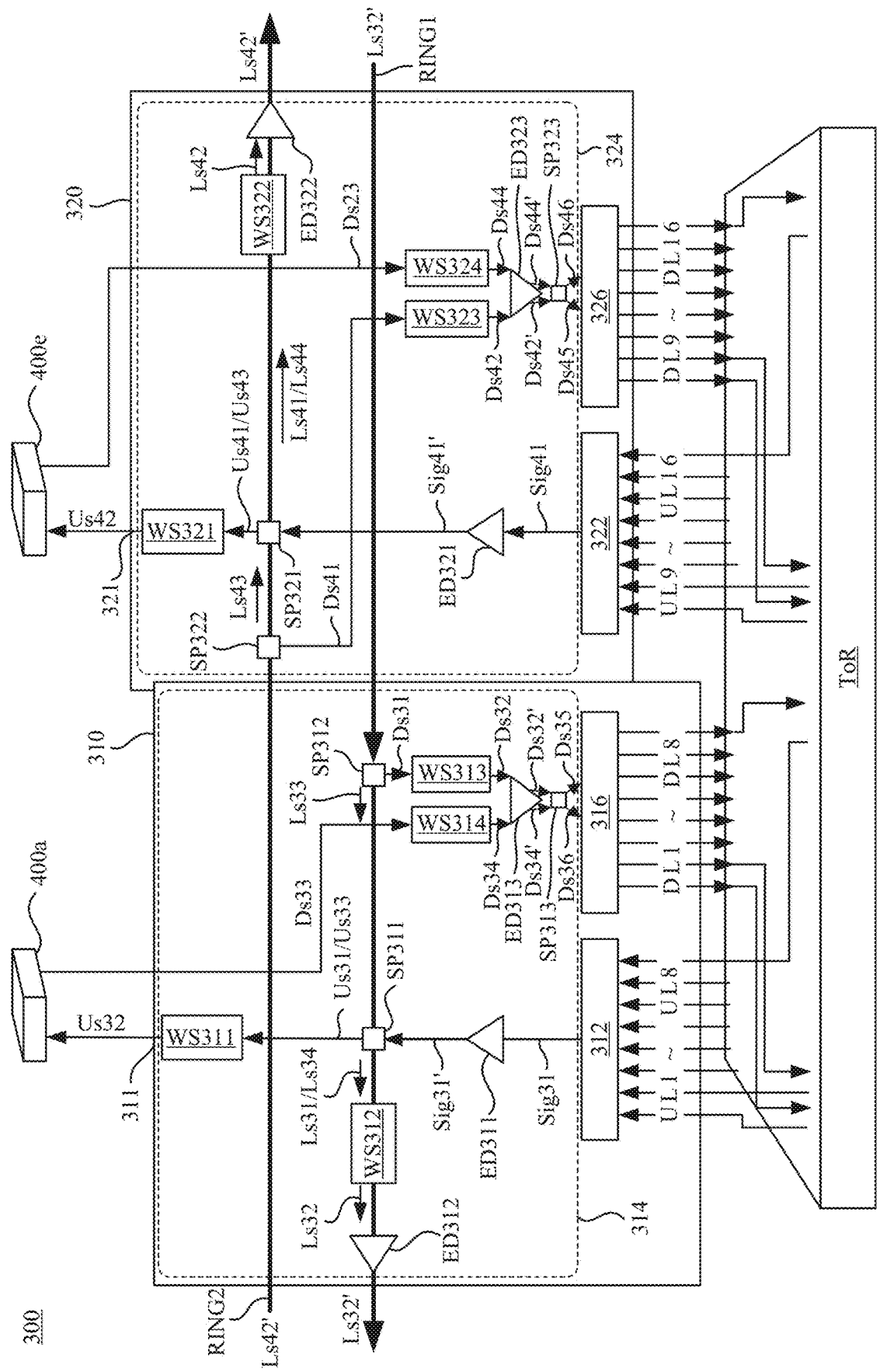
FIG. 3 is a schematic diagram of an OADS in accordance with some embodiments of the present disclosure.

Above are the detailed descriptions of the components in the OADS 200. However, in some embodiments, the third splitter SP213 and the third optical signal amplifier ED213 of the OADS 200 can swap their positions, and such change will not affect the function and operation of the OADS. Please now refer to FIG. 3. FIG. 3 is a schematic diagram of the OADS 300 in accordance with some embodiments of the present disclosure. As shown in FIG. 3, both the first transmission module 310 and the second transmission module 320 include multiplexers 312 and 322 as input sub-modules, include switching sub-modules 314 and 324, and include demultiplexers 316 and 326 as output sub-modules. Specifically, the switching sub-module 314 in the first transmission module 310 includes a first optical signal amplifier ED311, a first splitter SP311, a first wavelength selective switch WS311, a second wavelength selective switch WS312, a second optical signal amplifier ED312, a second splitter SP312, a third wavelength selective switch WS313, a fourth wavelength selective switch WS314, a third optical signal amplifier ED313, and a third splitter SP313. Similarly, the switching sub-module 324 in the second transmission module 320 includes a first optical signal amplifier ED321, a first splitter SP321, a first wavelength selective switch WS321, a second wavelength selective switch WS322, a second optical signal amplifier ED322, a second splitter SP322, a third wavelength selective switch WS323, a fourth wavelength selective switch WS324, a third optical signal amplifier ED323, and a third splitter SP323.

The multiplexer 312 connected to a Top-of-Rack switch ToR is configured to receive, through a plurality of input ports, a plurality of upstream optical signals UL1-UL8 from the Top-of-Rack switch ToR, and combine the upstream optical signals UL1-UL8 into a composite optical signal Sig31, wherein each of the upstream optical signals UL1-UL8 has its own wavelength. The first optical signal amplifier ED311 is coupled to the multiplexer 312 and configured to amplify the composite optical signal Sig31 and output an amplified composite optical signal Sig31'. The first splitter SP311 is disposed on the first transmission ring RING1 and coupled to the first optical signal amplifier ED311. The first splitter SP311 is configured to receive and duplicate the amplified composite optical signal Sig31' as a first lateral transmission optical signal Ls31 and as a first uplink transmission optical signal Us31, transmit the first lateral transmission optical signal Ls31 through the first transmission ring RING1, and output the first uplink transmission optical signal Us31. The first wavelength selective switch WS311 is coupled to the first splitter SP311. The first wavelength selective switch WS311 is configured to receive the first uplink transmission optical signal Us31 from the first splitter SP311 and transmit a second uplink transmission optical signal Us32 through a first longitudinal port 311 to the OSIS 400a. The second wavelength selective switch WS312 is disposed on the first transmission ring RING1 and coupled to the first splitter SP311. The second wavelength selective switch WS312 is configured to receive the first lateral transmission optical signal Ls31 from the first splitter SP311 and output a second lateral transmission optical signal Ls32. The second optical signal amplifier ED312 is disposed on the first transmission ring RING1 and coupled to the second wavelength selective switch WS312. The second optical signal amplifier ED312 is configured to receive and amplify the second lateral transmission optical signal Ls32 and output an amplified second lateral transmission optical signal Ls32' to the first transmission module 310 of another OADS 300 in the same pod.

The second splitter SP312 is disposed on the first transmission ring RING1. The second splitter SP312 is configured to receive and duplicate the amplified second lateral transmission optical signal Ls32' received from the first transmission module 310 of another OADS 300 in the same pod as a first downlink transmission optical signal Ds31 and as a third lateral transmission optical signal Ls33, output the first downlink transmission optical signal Ds31, and transmit the third lateral transmission optical signal Ls33 to the first splitter SP311. The third wavelength selective switch WS313 is coupled to the second splitter SP312. The third wavelength selective switch WS313 is configured to receive the first downlink transmission optical signal Ds11 from the second splitter SP312 and output a second downlink transmission optical signal Ds32. The fourth wavelength selective switch WS314 is configured to receive a third downlink transmission optical signal Ds33 from the OSIS 400a and output a fourth downlink transmission optical signal Ds34.

The third optical signal amplifier ED313 is coupled to the third wavelength selective switch WS313 and the fourth wavelength selective switch WS314. The third optical signal amplifier ED313 is configured to receive the second downlink transmission optical signal Ds32 from the third wavelength selective switch WS313, receive the fourth downlink transmission optical signal Ds34 from the fourth wavelength selective switch WS314, amplify the second downlink transmission optical signal Ds32 and the fourth downlink transmission optical signal Ds34, and output an amplified second downlink transmission optical signal Ds32' and an amplified fourth downlink transmission optical signal Ds34'. The third splitter SP313 is coupled to the third optical signal amplifier ED313. The third splitter SP313 is configured to receive the amplified second downlink transmission optical signal Ds32' and the amplified fourth downlink transmission optical signal Ds34' from the third optical signal amplifier ED313, combine the amplified second downlink transmission optical signal Ds32' and the amplified fourth downlink transmission optical signal Ds34' as a fifth downlink transmission optical signal Ds35, combine the amplified second downlink transmission optical signal Ds32' and the amplified fourth downlink transmission optical signal Ds34' as a sixth downlink transmission optical signal Ds36 and output the fifth downlink transmission optical signal Ds35 and the sixth downlink transmission optical signal Ds36. The demultiplexer 316 is coupled to the third splitter SP313 and connected to the Top-of-Rack switch ToR. The demultiplexer 316 is configured to receive and demultiplex the fifth downlink transmission optical signal Ds35 and the sixth downlink transmission optical signal Ds36 as a plurality of downstream optical signals DL1-DL8, and transmit the downstream optical signals DL1-DL8 to the Top-of-Rack switch ToR.

As to the components included in the switching sub-module 324 of the second transmission module 320, their function and operation can be referred to their counterparts in the switching sub-module 314. The function and operation of the multiplexer 322 of the second transmission module 320 can be referred to the multiplexer 312 of the first transmission module 310 in the following embodiment. The function and operation of first optical signal amplifier ED321 of the switching sub-module 324 can be referred to the first optical signal amplifier ED311 of the switching sub-module 314 in the following embodiment. The function and operation of the first splitter SP321 of the switching sub-module 324 can be referred to the first splitter SP311 of the switching sub-module 314 in the following embodiment. The function and operation of the first wavelength selective switch WS321 of the switching sub-module 324 can be referred to the first wavelength selective switch WS311 of the switching sub-module 314 in the following embodiment. The function and operation of the second wavelength selective switch WS322 of the switching sub-module 324 can be referred to the second wavelength selective switch WS312 of the switching sub-module 314 in the following embodiment. The function and operation of the second optical signal amplifier ED322 of the switching sub-module 324 can be referred to the second optical signal amplifier ED312 of the switching sub-module 314 in the following embodiment. The function and operation of the second splitter SP322 of the switching sub-module 324 can be referred to the second splitter SP312 of the switching sub-module 314 in the following embodiment. The function and operation of the third wavelength selective switch WS323 of the switching sub-module 324 can be referred to the third wavelength selective switch WS313 of the switching sub-module 314 in the following embodiment. The function and operation of the fourth wavelength selective switch WS324 of the switching sub-module 324 can be referred to the fourth wavelength selective switch WS314 of the switching sub-module 314 in the following embodiment. The function and operation of the third optical signal amplifier ED323 of the switching sub-module 324 can be referred to the third optical signal amplifier ED313 of the switching sub-module 314 in the following embodiment. The function and operation of the third splitter SP323 of the switching sub-module 324 can be referred to the third splitter SP313 of the switching sub-module 314 in the following embodiment. The function and operation of the demultiplexer 326 of the second transmission module 320 can be referred to the demultiplexer 316 of the first transmission module 310 in the following embodiment.

Below are the detailed descriptions of the OADS 300. For the purpose of brevity, in the following paragraphs, the first transmission module 310 of the OADS 300 will be used as an example to describe the operation of the components in the OADS 300. The components in the second transmission module 320 and their operation are similar to their counterparts in the first transmission module 310.

As shown in FIG. 3, structurally, the first optical signal amplifier ED311 is coupled to the multiplexer 312 and the first splitter SP311. The first optical signal amplifier ED311 is configured to receive the composite optical signal Sig31 from the multiplexer 312, amplify the composite optical signal Sig31, and output the amplified composite optical signal Sig31' to the first splitter SP311. In some embodiments, the first optical signal amplifier ED311 can be implemented as an erbium-doped fiber amplifier (EDFA).

As shown in FIG. 3, structurally, the first splitter SP311 is disposed on the first transmission ring RING1 and coupled to the first optical signal amplifier ED311, the first wavelength selective switch WS311, the second wavelength selective switch WS312, and the second splitter SP312. The first splitter SP311 is configured to receive the amplified composite optical signal Sig31' from the first optical signal amplifier ED311, duplicate the amplified composite optical signal Sig31' as the first lateral transmission optical signal Ls31 and as the first uplink transmission optical signal Us31, transmit the first lateral transmission optical signal Ls31 through the first transmission ring RING1 to the second wavelength selective switch WS312, and output the first uplink transmission optical signal Us31 to the first wavelength selective switch WS311.

As shown in FIG. 3, structurally, the first wavelength selective switch WS311 is coupled to the first splitter SP311 and the OSIS 400a. The first wavelength selective switch WS311 is configured to receive the first uplink transmission optical signal Us31 from the first splitter SP311 and transmit the second uplink transmission optical signal Us32 through a first longitudinal port 311 to the OSIS 400a.

Specifically, the first wavelength selective switch WS311 is a 1×1 (1 input port and 1 output port) wavelength selective switch which allows only signals with specific wavelength to pass through.

As shown in FIG. 3, structurally, the second wavelength selective switch WS312 is disposed on the first transmission ring RING1 and coupled to the first splitter SP311 and the second optical signal amplifier ED312. The second wavelength selective switch WS312 is configured to receive the first lateral transmission optical signal Ls31 from the first splitter SP311 and output the second lateral transmission optical signal Ls32 to the second optical signal amplifier ED312.

Specifically, the second wavelength selective switch WS312 is a 1×1 (1 input port and 1 output port) wavelength selective switch which allows only signals with specific wavelength to pass through.

As shown in FIG. 3, structurally, the second optical signal amplifier ED312 is disposed on the first transmission ring RING1 and coupled to the second wavelength selective switch WS312 and the second splitter SP312 of another OADS 300. The second optical signal amplifier ED312 is configured to receive the second lateral transmission optical signal Ls32 from the second wavelength selective switch WS312, amplify the second lateral transmission optical signal Ls32, and output the amplified second lateral transmission optical signal Ls32' to the first transmission module 310 of another OADS 300 in the same pod. In other words, in the embodiment shown in FIG. 3, the optical signal amplifier ED312 amplifies the power of the optical signal which is being transmitted to the West to ensure that the optical signal has sufficient power to reach its destination. It is worth noting that the present disclosure does not limit the direction of transmission to the West. In actual applications, the transmission direction can be adjusted according to the network configuration. In some embodiments, the second optical signal amplifier ED312 can be implemented as an erbium-doped fiber amplifier (EDFA).

As shown in FIG. 3, structurally, the second splitter SP312 is disposed on the first transmission ring RING1 and is coupled to the third wavelength selective switch WS313, the first splitter SP311, and the second optical signal amplifier ED312 of another OADS 300. The second splitter SP312 is configured to receive the amplified second lateral transmission optical signal Ls32' from the first transmission module 310 of another OADS 300 in the same pod, duplicate the amplified second lateral transmission optical signal Ls32' as the first downlink transmission optical signal Ds31 and as the third lateral transmission optical signal Ls33, transmit the third lateral transmission optical signal Ls33 through the first transmission ring RING1, and output the first down link transmission optical signal Ds31 to the third wavelength selective switch WS313.

Specifically, the second splitter SP312 is 1×2 (1 input port and 2 output ports) splitter which duplicates and splits the amplified second lateral transmission optical signal Ls32' into two beams. In the embodiment shown in FIG. 3, one of the two beams is continually transmitted to the West to other OADSs in the same pod P1 with a lower intensity, compared with another one of the two beams transmitted downwardly to the optical receiving module (i.e., the demultiplexer 316) with a higher intensity. However, the present disclosure does not limit the direction of transmission to the West. In actual applications, the transmission direction can be adjusted according to the network configuration.

As shown in FIG. 3, structurally, the third wavelength selective switch WS313 is coupled to the second splitter SP312 and the third optical signal amplifier ED313. The third wavelength selective switch WS313 is configured to receive the first downlink transmission optical signal Ds31 from the second splitter SP312 and output the second downlink transmission optical signal Ds32 to the third optical signal amplifier ED313.

Specifically, the third wavelength selective switch WS313 is a 1×1 (1 input port and 1 output port) wavelength selective switch which allows only signals with specific wavelength to pass through.

As shown in FIG. 3, structurally, the fourth wavelength selective switch WS314 is coupled to the third optical signal amplifier ED313 and the OSIS 400a. The fourth wavelength selective switch WS314 is configured to receive the third downlink transmission optical signal Ds33 from the OSIS 400a and output the fourth downlink transmission optical signal Ds34 to the third optical signal amplifier ED313.

Specifically, the fourth wavelength selective switch WS314 is a 1×1 (1 input port and 1 output port) wavelength selective switch which allows only signals with specific wavelength to pass through.

As shown in FIG. 3, structurally, the third optical signal amplifier ED313 is coupled to the third wavelength selective switch WS313, the fourth wavelength selective switch WS314, and the third splitter SP313. The third optical signal amplifier ED313 is configured to receive the second downlink transmission optical signal Ds32 from the third wavelength selective switch WS313, receive the fourth downlink transmission optical signal Ds34 from the fourth wavelength selective switch WS314, amplify the second downlink transmission optical signal Ds32 and the fourth downlink transmission optical signal Ds34, and output the amplified second downlink transmission optical signal Ds32' and the amplified fourth downlink transmission optical signal Ds34' to the third splitter SP313. In some embodiments, the third optical signal amplifier ED313 can be implemented as an erbium-doped fiber amplifier (EDFA).

As shown in FIG. 3, structurally, the third splitter SP313 is coupled to the third optical signal amplifier ED313 and the demultiplexer 316. The third splitter SP313 is configured to receive the amplified second downlink transmission optical signal Ds32' and the amplified fourth downlink transmission optical signal Ds34' from the third optical signal amplifier ED313, combine the amplified second downlink transmission optical signal Ds32' and the amplified fourth downlink transmission optical signal Ds34' as the fifth downlink transmission optical signal Ds35 and as the sixth downlink transmission optical signal Ds36, and transmit the fifth downlink transmission optical signal Ds35 and the sixth downlink transmission optical signal Ds36 to the demultiplexer 316.

As shown in FIG. 3, structurally, the demultiplexer 316 is coupled to the third splitter SP313 and connected to the Top-of-Rack switch ToR. The demultiplexer 316 is configured to receive the fifth downlink transmission optical signal Ds35 and the sixth downlink transmission optical signal Ds36 from the third splitter SP313, demultiplex the fifth downlink transmission optical signal Ds35 and the sixth downlink transmission optical signal Ds36 as a plurality of downstream optical signals DL1-DL8, and transmit the downstream optical signals DL1-DL8 to the Top-of-Rack switch ToR.

In addition, in some embodiments, the first splitter SP311 is further configured to receive the third lateral transmission optical signal Ls33 from the second splitter SP312, duplicate the third lateral transmission optical signal Ls33 as a fourth lateral transmission optical signal Ls34 and as a third uplink transmission optical signal Us33, transmit the fourth lateral transmission optical signal Ls34 through the first transmission ring RING1, and transmit the third uplink transmission optical signal Us33 through the first longitudinal port 311 to the OSIS 400a.

Specifically, the first splitter SP311 is a 2×2 (2 input ports and 2 output ports) splitter. One of its two input ports is to receive the composite optical signal Sig31 from the first optical signal amplifier ED311, and the other one of the input ports is to receive the third lateral transmission optical signal Ls33 from the second splitter SP312. One of its two output ports is to output the first lateral transmission optical signal Ls31 or the fourth lateral transmission optical signal Ls34 to the second wavelength selective switch WS312, and the other one of the output ports is to output the first uplink transmission optical signal Us31 or the third uplink transmission optical signal Us33 to the first wavelength selective switch WS311.

Figure 4:
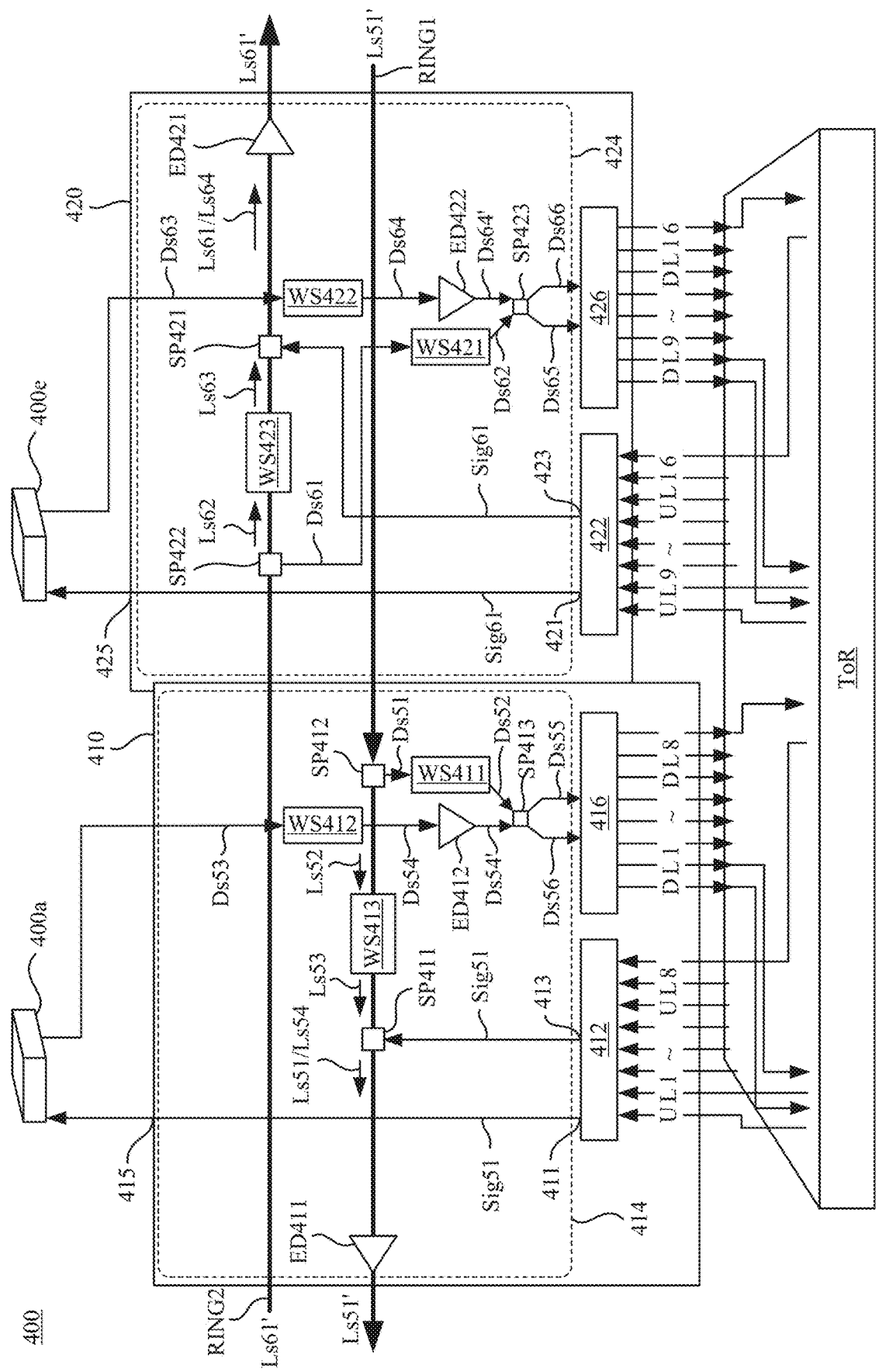
FIG. 4 is a schematic diagram of an OADS in accordance with some embodiments of the present disclosure.

Above are the descriptions of the OADS 300. The present disclosure also discloses another embodiment of the switching sub-modules for the OADSs of the first tier network T1. Please refer to FIG. 4. FIG. 4 is a schematic diagram of the OADS 400 in accordance with some embodiments of the present disclosure. The OADS 400 is a core switch node for building optical tunnels between the racks of the first tier network T1 for data transmission. As shown in FIG. 4, the OADS 400 includes two or more independent transmission modules, such as a first transmission module 410 and a second transmission module 420.

As shown in FIG. 4, both the first transmission module 410 and the second transmission module 420 include multiplexers 412 and 422 as in put sub-modules, include switching sub-modules 414 and 424, and include demultiplexers 416 and 426 as output sub-modules. Specifically, the switching sub-module 414 in the first transmission module 410 includes a first splitter SP411, a first optical signal amplifier ED411, a second splitter SP412, a first wavelength selective switch WS411, a second wavelength selective switch WS412, a second optical signal amplifier ED412, a third splitter SP413, and a third wavelength selective switch WS413. Similarly, the switching sub-module 424 in the second transmission module 420 includes a first splitter SP421, a first optical signal amplifier ED421, a second splitter SP422, a first wavelength selective switch WS421, a second wavelength selective switch WS422, a second optical signal amplifier ED422, a third splitter SP423, and a third wavelength selective switch WS423.

The multiplexer 412 connected to the Top-of-Rack switch ToR is configured to receive, through a plurality of input ports, a plurality of upstream optical signals UL1-UL8 from the Top-of-Rack switch ToR, and combine the upstream optical signals UL1-UL8 into a composite optical signal Sig51, wherein a first output terminal 411 of the multiplexer 412 is configured to transmit the composite optical signal Sig51 through a first longitudinal port 415 to the OSIS 400a, and a second output terminal 413 of the multiplexer 412 is configured to output the composite optical signal Sig51. Each of the upstream optical signals UL1-UL8 has its own corresponding wavelength. The first splitter SP411 is disposed on the first transmission ring RING1 and coupled to the multiplexer 412. The first splitter SP411 is configured to receive the composite optical signal Sig51 from the second output terminal 413 of the multiplexer 412 and transmit a first lateral transmission optical signal Ls51 through the first transmission ring RING1. The first optical signal amplifier ED411 is disposed on the first transmission ring RING1 and is coupled to the first splitter SP411. The optical signal amplifier ED411 is configured to amplify the first lateral transmission optical signal Ls51 and output an amplified first lateral transmission optical signal Ls51' to the first transmission module 410 of another OADS 400 in the same pod.

The second splitter SP412 is disposed on the first transmission ring RING1 and is configured to receive and duplicate the amplified first lateral transmission optical signal Ls51' received from the first transmission module 410 of another OADS 400 in the same pod as a first downlink transmission optical signal Ds51 and as a second lateral transmission optical signal Ls52, and transmit the second lateral transmission optical signal Ls52 through the first transmission ring RING1. The first wavelength selective switch WS411 is coupled to the second splitter SP412. The first wavelength selective switch WS411 is configured to receive the first downlink transmission optical signal Ds51 from the second splitter SP412 and output a second downlink transmission optical signal Ds52. The second wavelength selective switch WS412 is configured to receive a third downlink transmission optical signal Ds53 from the OSIS 400a and output a fourth downlink transmission optical signal Ds54. The second optical signal amplifier ED412 is coupled to the second wavelength selective switch WS412. The second optical signal amplifier ED412 is configured to amplify the fourth downlink transmission optical signal Ds54 and output an amplified fourth downlink transmission optical signal Ds54'. The third splitter SP413 is coupled to the first wavelength selective switch WS411 and the second optical signal amplifier ED412. The third splitter SP413 is configured to receive the second downlink transmission optical signal Ds52 and the amplified fourth downlink transmission optical signal Ds54', combine the second downlink transmission optical signal Ds52 and the amplified fourth downlink transmission optical signal Ds54' as a fifth downlink transmission optical signal Ds55 and as a sixth downlink transmission optical signal Ds56, and output the fifth downlink transmission optical signal Ds55 and the sixth downlink transmission optical signal Ds56. The demultiplexer 416 is coupled to the third splitter SP413 and connected to the Top-of-Rack switch ToR. The demultiplexer 416 is configured to receive and demultiplex the fifth downlink transmission optical signal Ds55 and the sixth downlink transmission optical signal Ds56 as a plurality of downstream optical signals DL1-DL8, and transmit the downstream optical signals DL1-DL8 to the Top-of-Rack switch ToR.

The third wavelength selective switch WS413 is disposed on the first transmission ring RING1 and coupled to the second splitter SP412. The third wavelength selective switch WS413 is configured to receive the second lateral transmission optical signal Ls52 and output a third lateral transmission optical signal Ls53.

As to the components included in the switching sub-module 424 of the second transmission module 420, their function and operation can be referred to their counterparts in the switching sub-module 414. The function and operation of the multiplexer 422 of the second transmission module 420 can be referred to the multiplexer 412 of the first transmission module 410 in the following embodiment. The function and operation of the first splitter SP421 of the switching sub-module 424 can be referred to the first splitter SP411 of the switching sub-module 414 in the following embodiment. The function and operation of first optical signal amplifier ED421 of the switching sub-module 424 can be referred to the first optical signal amplifier ED411 of the switching sub-module 414 in the following embodiment. The function and operation of the second splitter SP422 of the switching sub-module 424 can be referred to the second splitter SP412 of the switching sub-module 414 in the following embodiment. The function and operation of the first wavelength selective switch WS421 of the switching sub-module 424 can be referred to the first wavelength selective switch WS411 of the switching sub-module 414 in the following embodiment. The function and operation of the second wavelength selective switch WS422 of the switching sub-module 424 can be referred to the second wavelength selective switch WS412 of the switching sub-module 414 in the following embodiment. The function and operation of the second optical signal amplifier ED422 of the switching sub-module 424 can be referred to the second optical signal amplifier ED412 of the switching sub-module 414 in the following embodiment. The function and operation of the third splitter SP423 of the switching sub-module 424 can be referred to the third splitter SP413 of the switching sub-module 414 in the following embodiment. The function and operation of the third wavelength selective switch WS423 of the switching sub-module 424 can be referred to the third wavelength selective switch WS413 of the switching sub-module 414 in the following embodiment. The function and operation of the demultiplexer 426 of the second transmission module 420 can be referred to the demultiplexer 416 of the first transmission module 410 in the following embodiment.

Each input port of the multiplexers 412 and 422 is coupled, through optical fiber, to a transmitter of the various DWDM transceivers on an uplink port of Top-of-Rack switch in the rack. The main function of the switching sub-modules 414 and 424 is to successively upload the composite optical signals Sig51 and Sig61 transmitted from the input sub-module (i.e., the multiplexers 412 and 422) to the OSISs 400a and 400e in the second tier network T2, or transmit, to East or West, to the other OADSs 400 in the same pod, and switch the optical signals transmitted from the other OADSs 400 in the same pod to the receiving sub-modules 416 and 426. For example, in FIG. 1, the OADSs in the pod P2 can transmit the optical signals to the other four OADSs in the pod P2 and receive the optical signals from the other four OADSs in the pod P2. Likewise, the OADSs in each pod in FIG. 1 can transmit the optical signals to the other four OADSs in the same pod and receive the optical signals from the other four OADSs in the same pod.

Below are the detailed descriptions of the OADS 400. For the purpose of brevity, in the following paragraphs, the first transmission module 410 of the OADS 400 will be used as an example to describe the operation of the components in the OADS 400. The components in the second transmission module 420 and their operation are similar to their counterparts in the first transmission module 410.

As shown in FIG. 4, structurally, the first splitter SP411 is disposed on the first transmission ring RING1 and is coupled to the multiplexer 412 (specifically, the second output terminal 413 of the multiplexer 412), the first optical signal amplifier ED411, and the third wavelength selective switch WS413. The first splitter SP411 is configured to receive the composite optical signal Sig51 from the second output terminal 413 of the multiplexer 412 and transmit the first lateral transmission optical signal Ls51 through the first transmission ring RING1 to the first optical signal amplifier ED411.

As shown in FIG. 4, structurally, the first optical signal amplifier ED411 is disposed on the first transmission ring RING1 and is coupled to the first splitter SP411 and the second splitter SP412 of another OADS 400 in the same pod. The optical signal amplifier ED411 is configured to receive the first lateral transmission optical signal Ls51 from the first splitter SP411, amplify the first lateral transmission optical signal Ls51, and output the amplified first lateral transmission optical signal Ls51' to the first transmission module 410 of another OADS 400 in the same pod. In some embodiments, the first optical signal amplifier ED411 can be implemented with erbium-doped fiber amplifier (EDFA).

As shown in FIG. 4, structurally, the second splitter SP412 is disposed on the first transmission ring RING1 and is coupled to the first wavelength selective switch WS411, the third wavelength selective switch WS413, and the optical signal amplifier ED411 of another OADS 400 in the same pod. The second splitter SP412 is configured to receive the amplified first lateral transmission optical signal Ls51' from the first transmission module 410 of another OADS 400 in the same pod, duplicate the amplified first lateral transmission optical signal Ls51' as the first downlink transmission optical signal Ds51 and as the second lateral transmission optical signal Ls52, transmit the first downlink transmission optical signal Ds51 to the first wavelength selective switch WS411, and transmit the second lateral transmission optical signal Ls52 through the first transmission ring RING1 to the third wavelength selective switch WS413.

Specifically, the second splitter SP412 is 1×2 (1 input port and 2 output ports) splitter which duplicates and splits the amplified first lateral transmission optical signal Ls51' into two beams. When duplicating and splitting the amplified first lateral transmission optical signal Ls51', the second splitter SP412 transmits one beam with a higher intensity toward the first wavelength selective switch WS411 compared to another beam with a lower intensity toward the third wavelength selective switch WS413. In the embodiment shown in FIG. 4, one of the two beams continually transmits to the West to other OADSs in the same pod, and the other of the two beams transmits downwardly to the optical receiving module (i.e., the demultiplexer 416). However, the present disclosure does not limit the direction of transmission to the West. In actual applications, the transmission direction can be adjusted according to the network configuration.

As shown in FIG. 4, structurally, the first wavelength selective switch WS411 is coupled to the second splitter SP412 and the third splitter SP413. The first wavelength selective switch WS411 is configured to receive the first downlink transmission optical signal Ds51 from the second splitter SP412 and output the second downlink transmission optical signal Ds52 to the third splitter SP413.

Specifically, the first wavelength selective switch WS411 is a 1×1 (1 input port and 1 output port) wavelength selective switch which allows only signals with specific wavelength to pass through.

As shown in FIG. 4, structurally, the second wavelength selective switch WS412 is coupled to the second optical signal amplifier ED412 and the OSIS 400a. The second wavelength selective switch WS412 is configured to receive the third downlink transmission optical signal Ds53 from the OSIS 400a and output the fourth downlink transmission optical signal Ds54 to the second optical signal amplifier ED412.

Specifically, the second wavelength selective switch WS412 is a 1×1 (1 input port and 1 output port) wavelength selective switch which allows only signals with specific wavelength to pass through.

As shown in FIG. 4, structurally, the second optical signal amplifier ED412 is coupled to the second wavelength selective switch WS412 and the third splitter SP413. The second optical signal amplifier ED412 is configured to receive the fourth downlink transmission optical signal Ds54 from the second wavelength selective switch WS412, amplify the fourth downlink transmission optical signal Ds54, and output the amplified fourth downlink transmission optical signal Ds54' to the third splitter SP413. In some embodiments, the second optical signal amplifier ED412 can be implemented with erbium-doped fiber amplifier (EDFA).

As shown in FIG. 4, structurally, the third splitter SP413 is coupled to the first wavelength selective switch WS411, the second optical signal amplifier ED412, and the demultiplexer 416. The third splitter SP413 is configured to receive the second downlink transmission optical signal Ds52 from the first wavelength selective switch WS411, receive the amplified fourth downlink transmission optical signal Ds54' from the second optical signal amplifier ED412, combine the second downlink transmission optical signal Ds52 and the amplified fourth downlink transmission optical signal Ds54' as the fifth downlink transmission optical signal Ds55 and as the sixth downlink transmission optical signal Ds56, and transmit the fifth downlink transmission optical signal Ds55 and the sixth downlink transmission optical signal Ds56 to the demultiplexer 416.

Specifically, the third splitter SP413 is a 2×2 (2 input port ports and 2 output port ports) splitter. One of its two input ports is to receive the second downlink transmission optical signal Ds52 from the first wavelength selective switch WS411, and the other one of the input ports is to receive the amplified fourth downlink transmission optical signal Ds54' from the second optical signal amplifier ED412. One of its two output ports is to output the fifth downlink transmission optical signal Ds55, and the other one of the output ports is to output the sixth downlink transmission optical signal Ds56.

As shown in FIG. 4, structurally, the demultiplexer 416 is coupled to the third splitter SP413 and connected to the Top-of-Rack switch ToR. The demultiplexer 416 is configured to receive the fifth downlink transmission optical signal Ds55 and the sixth downlink transmission optical signal Ds56 from the third splitter SP413, demultiplex the fifth downlink transmission optical signal Ds55 and the sixth downlink transmission optical signal Ds56 as a plurality of downstream optical signals DL1-DL8, and transmit the downstream optical signals DL1-DL8 to the Top-of-Rack switch ToR.

As shown in FIG. 4, structurally, the third wavelength selective switch WS413 is disposed on the first transmission ring RING1 and is coupled to the second splitter SP412 and the first splitter SP411. The third wavelength selective switch WS413 is configured to receive the second lateral transmission optical signal Ls52 from the second splitter SP412 and output the third lateral transmission optical signal Ls53 to the first splitter SP411.

Specifically, the third wavelength selective switch WS413 is a 1×1 (1 input port and 1 output port) wavelength selective switch which allows only signals with specific wavelength to pass through.

In addition, in some embodiments, the first splitter SP411 is further configured to receive the third lateral transmission optical signal Ls53 from the third wavelength selective switch WS413, duplicate the third lateral transmission optical signal Ls53 as a fourth lateral transmission optical signal Ls54, and transmit the fourth lateral transmission optical signal Ls54 through the first transmission ring RING1.

Specifically, the first splitter SP411 is a 2×1 (2 input ports and 1 output port) splitter. One of its two input ports is to receive the composite optical signal Sig51 from the second output terminal 413 of the multiplexer 412, and the other one of the input ports is to receive the third lateral transmission optical signal Ls53 from the third wavelength selective switch WS413. The output port of the third wavelength selective switch WS413 is to output the third lateral transmission optical signal Ls53. When duplicating and splitting the composite optical signal Sig51 and the third lateral transmission optical signal Ls53, the first splitter SP411 generates one beam from two input signal (i.e., the composite optical signal Sig51 and the third lateral transmission optical signal Ls53), which are combined equally with a similar weight into the output beam.

The second lateral transmission optical signal Ls52 passes through the 1×1 third wavelength selection switch WS413, and the third wavelength selective switch WS413 selects the specific optical wavelength signal of the second lateral transmission optical signal Ls52 as the third lateral transmission optical signal Ls53. Then, through the first splitter SP411 duplicating and splitting, one optical signal as the fourth lateral transmission optical signal Ls54 is transmitted continually to the West to the other OADSs in the same optical node pod. However, the present disclosure does not limit the direction of transmission to the West. In actual applications, the transmission direction can be adjusted according to the network configuration.

Figure 5:
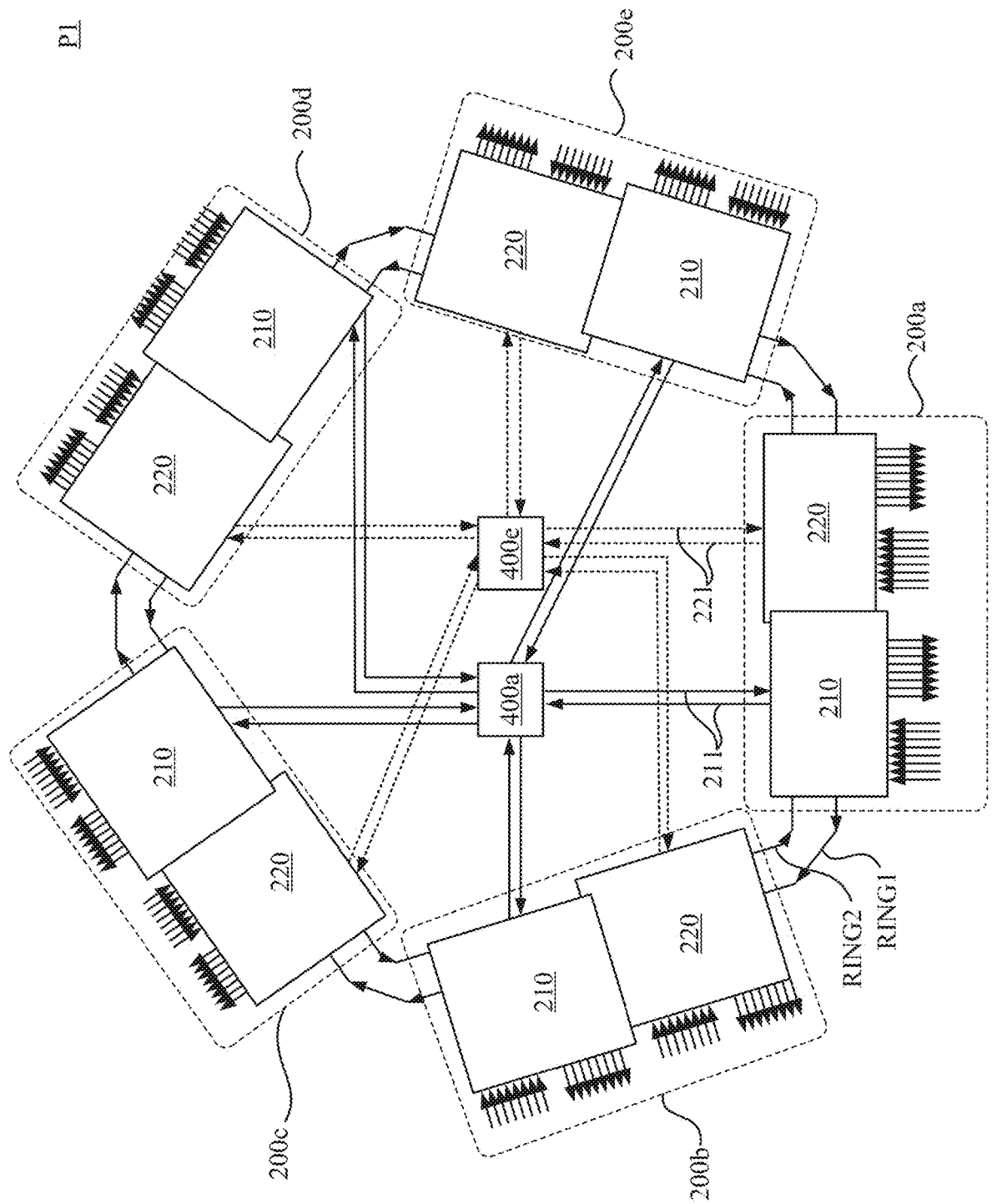
FIG. 5 is a connection relationship diagram of the first transmission modules and the second transmission modules of the OADSs in the same pod in accordance with some embodiments of the present disclosure.

Below describes the connection relationship of the first transmission modules and the second transmission modules of the OADS in the same pod. For the brevity of description, the OADSs 200*a*-200*e* are taken as examples. However, the OADSs 300, as shown in FIG. 3, or the OADSs 400, as shown in FIG. 4, can have the similar connection relationship. Please refer to FIG. 5. FIG. 5 is a connection relationship diagram of the first transmission modules 210 and the second transmission modules 220 of the OADSs 200*a*-200*e* in the same pod in accordance with some embodiments of the present disclosure.

It should be noted that, as shown in FIG. 5, in some embodiments, the first transmission modules 210 and the second transmission modules 220 of the OADSs 200*a*-200*e* transmit, through the first transmission ring RING1 and the second transmission ring RING2 respectively, the lateral transmission optical signals Ls11, Ls12, Ls12', Ls13, Ls14, Ls21, Ls22, Ls22', Ls23, and Ls24. The optical transmission directions in the first transmission ring RING1 and the second transmission ring RING2 are opposite to each other. For example, each of the first transmission modules 210 transmits signals in a westward direction (i.e., a clockwise direction) with the first transmission ring RING1, and each of the second transmission modules 220 transmits signals eastward (i.e., counter-clockwise direction) with the second transmission ring RING2. However, the disclosure is not limited thereto. In other embodiments, the first transmission ring RING1 and the second transmission ring RING2 can also transmit the lateral transmission optical signals Ls11, Ls12, Ls12', Ls13, Ls14, Ls21, Ls22, Ls22', Ls23, and Ls24 in the same optical transmission direction.

In addition, as shown in FIG. 5, the first transmission modules 210 of the OADSs 200*a*-200*e* are coupled to the OSIS 400*a* through a plurality of corresponding first longitudinal ports 211 (shown by solid arrows in the figure) respectively. The second transmission modules 220 of the OADSs 200*a*-200*e* are coupled to, through a plurality of corresponding second longitudinal ports 221 (shown by dashed arrows in the figure), the OSIS 400*e* which is adjacent to the OSIS 400*a*.

Please refer to FIG. 2-4. Each of the first and second transmission modules 210, 220, 310, 320, 410, and 420 includes a Band multiplexer (hereinafter Band MUX), i.e., the multiplexers 212, 222, 312, 322, 412, and 422, and each Band MUX corresponds to a specific wavelength group. Each of the Band MUXs combines the optical signals received from the input ports and transmits the composite optical signal through one optical fiber to the switching module of the OADSs. Each of the input ports is coupled, through optical fiber, to a transmitter of the various DWDM transceivers on an uplink port of Top-of-Rack switch in the rack, wherein the transmitter corresponds to the wavelength group used by the corresponding input port. Specifically, a Band MUX includes eight input ports, and each input port can receive a set of five wavelengths (i.e., a wavelength group). Therefore, a Band MUX can receive forty wavelengths in total.

Each of the first and second transmission modules 210, 220, 310, 320, 410, and 420 includes a Band demultiplexers (hereinafter Band DEMUX), i.e., the demultiplexers 216, 226, 316, 326, 416, and 426. A Band DEMUX receives signals with various wavelengths and filters those signals so that only the signals with wavelengths corresponding to certain wavelength group can enter the corresponding dropport. Assume that the intelligence-defined optical tunnel system uses forty wavelengths (which can be arranged in ascending order as A1-A40), that each wavelength group includes eight wavelengths, and that each of the first and second transmission modules includes eight drop-ports. Each of the Band DEMUXs will select eight wavelength signals (i.e., signals with eight different wavelengths) from the forty wavelength signals (i.e., the maximum of wavelength signals which the Band DEMUX can receive) to enter the eight drop-ports according to a wavelength configuration, wherein each drop-port corresponds to a wavelength group and can receive only one wavelength at a time. In one embodiment, the wavelength configuration of the Band DEMUX is shown as the Table 1 below:

| Port | Group1 | Group2 | Group3 | Group4 | Group5 |
|------|--------|--------|--------|--------|--------|
| 1 | λ1 | λ2 | λ3 | λ4 | λ5 |
| 2 | λ6 | λ7 | λ8 | λ9 | λ10 |
| 3 | λ11 | λ12 | λ13 | λ14 | λ15 |
| 4 | λ16 | λ17 | λ18 | λ19 | λ20 |
| 5 | λ21 | λ22 | λ23 | λ24 | λ25 |
| 6 | λ26 | λ27 | λ28 | λ29 | λ30 |
| 7 | λ31 | λ32 | λ33 | λ34 | λ35 |
| 8 | λ36 | λ37 | λ38 | λ39 | λ40 |

Table 1 As shown in the Table 1, the first wavelengths in each wavelength group (i.e., A1, A2, A3, A4, and A5) will enter the first drop-port of the Band DEMUX when received by the Band DEMUXs, and the second wavelengths in each wavelength group (i.e., A6, A7, A8, A9, and A10) will enter the second drop-port of the Band DEMUX when received by the Band DEMUXs, and so on.

Each drop-port is connected, through the optical fiber, to a receiver of the DWDM transceivers on an uplink port of Top-of-Rack switch in the rack, wherein the receiver corresponds to the wavelength group used by the corresponding drop-port.

The following paragraphs are the descriptions for the design of the network structure of the interconnection of the OADSs 200a-200e to form the pod P1. Please refer to FIG. 5 again. As shown in FIG. 5, the OADSs 200a-200e form a pod P1 with optical fiber connection in series. As described above, an amount of the OADSs 200a-200e being connected in series in one pod depends on the amount of wavelengths configured in each independent first transmission module 210 and a second transmission module 220 and the total amount of wavelength types supported by the intelligence-defined optical tunnel network system 100. The first transmission module 210 and the second transmission module 220 of each OADSs 200a-200e may be connected in series to the corresponding first transmission module 210 and the second transmission module 220 of adjacent OADS 200a-200e, forming a ring-shaped network.

Therefore, a pod will include a plurality of independent ring networks. The frequency band wavelength used by each transmission module (i.e., the first transmission module 210) belonging to the same transmission ring (i.e., the first transmission ring RING1) cannot be repeated to each other and be arranged in counterclockwise ascendingly according to the wavelength frequency. In addition, because the transmission rings are independent of each other, the same wavelength can be reused on different rings. Alternately, in some embodiments, the types and amounts of wavelengths used on the first transmission ring RING1 and the second transmission ring RING2 are the same.

The following paragraphs are the descriptions for the design of the multiplexers used in the intelligence-defined optical tunnel network system. In some embodiments, each of the Band MUXs (i.e., the multiplexers 212, 222, 312, 322, 412, and 422) includes M input ports, and each of the M input ports is pre-configured to receive an upstream optical signal that corresponds to a set of N designated wavelengths selected from M*N different wavelengths. M and N are positive integers. Therefore, each of the Band MUXs is configured to receive the upstream optical signals with N designated wavelengths selected from M*N different wavelengths. Take the embodiment shown in Table 1 as an example. A Band MUX has eight input ports (i.e., M equals to eight), and each input port is configured to receive a group of five wavelengths (i.e., N equals to five), so the Band MUX can receive up to forty optical signals with different wavelengths.

Because the Band MUXs can receive signals with a wide range of wavelengths, a same type of Band MUX can be used for all of the first and second transmission modules in the intelligence-defined optical tunnel network system. Please refer to FIG. 1. Take the pod P1 as an example. The Band MUXs used in the OADSs 200a-200e are all the same in terms of their design and structure, though they are configured to receive signals which fall into different wavelength groups. For example, in the OADS 200a, the multiplexer 212 is configured to receive signals with wavelengths A1, A6, A11, A16, A21, A26, A31, and A36 (i.e., wavelength group Group1), and the multiplexer 222 is configured to receive signals with wavelengths A2, A7, A12, A17, A22, A27, A32, and A37 (i.e., wavelength group Group2). Further, in the OADS 200b, the multiplexer 212 is configured to receive signals with wavelengths A2, A7, A12, A17, A22, A27, A32, and A37 (i.e., wavelength group Group2), and the multiplexer 222 is configured to receive signals with wavelengths A3, A8, A13, A18, A23, A28, A33, and A38 (i.e., wavelength group Group3). So on and so forth. Therefore, despite configured to receive signals falling into different wavelength groups, the Band MUXs are all the same in terms of their design. In this sense, the Band MUX disclosed is universal.

Figure 6A:
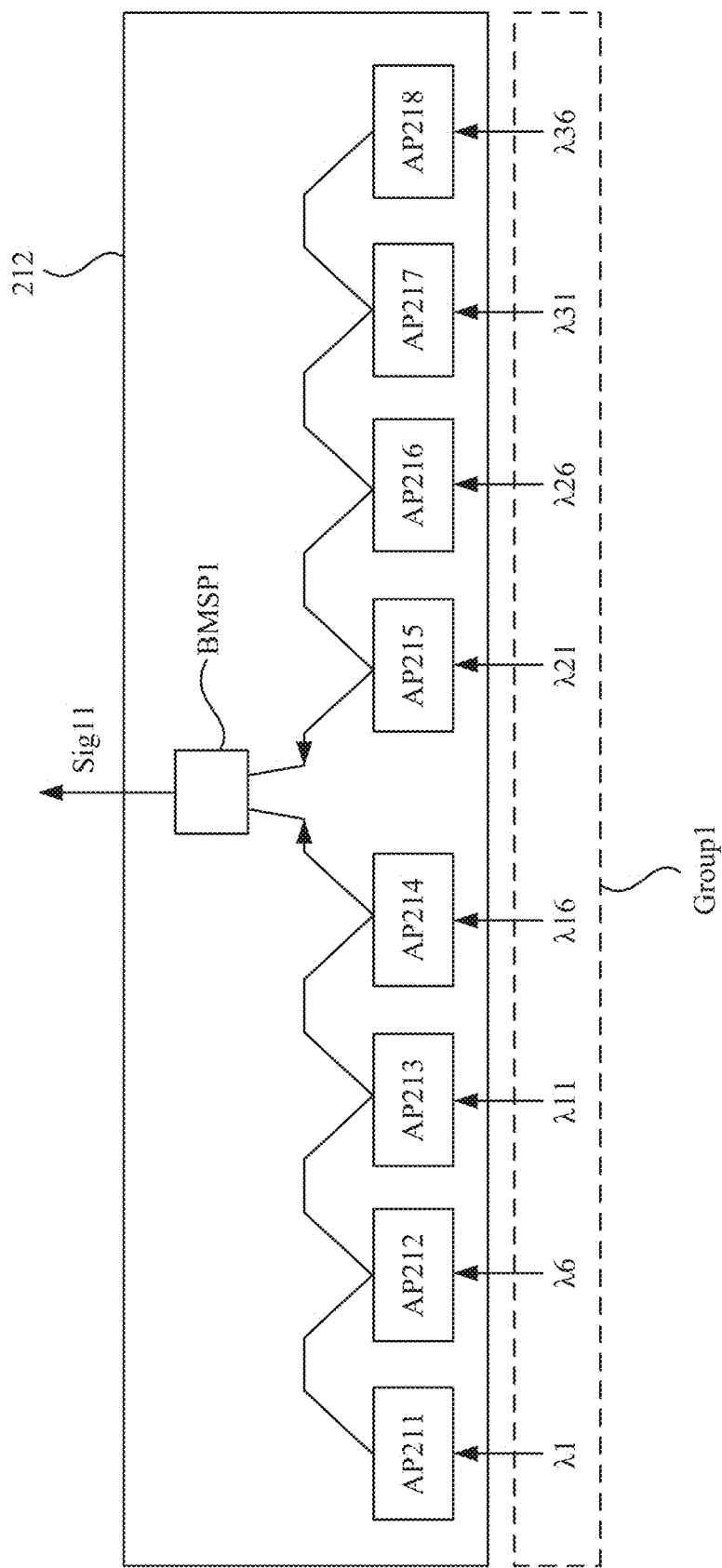
FIG. 6A is a diagram of a multiplexer in accordance with some embodiments of the present disclosure.

The following paragraphs are the detailed descriptions of the design of the multiplexers. The multiplexers 212, 222, and 412 are used as examples here. Other multiplexers can have similar designs. Please refer to FIG. 2 and FIG. 6A. FIG. 6A is a diagram of the multiplexer 212 in accordance with some embodiments of the present disclosure. As shown in FIG. 6A, the multiplexer 212 includes eight input ports AP211-AP218 and a splitter BMSP1. Assume that the multiplexer 212 is configured to receive signals of the wavelength group Group1 (i.e., the Group1 in Table 1), then the input port AP211 is configured to receive signal with wavelength A1, the input port AP212 is configured to receive signal with wavelength A6, the input port AP213 is configured to receive signal with wavelength A11, and so on. As shown in FIG. 6A, when the input ports AP211-AP218 receive the corresponding signals from the Top-of-Rack switch ToR, the input ports AP211-AP218 transmit the signals to the splitter BMSP1, and the splitter BMSP1 combines the signals into the composite optical signal Sig11. The multiplexer 212 then transmits the composite optical signal Sig11 to the first optical signal amplifier ED211 of the OADS 200, as shown in FIG. 2.

Figure 6B:
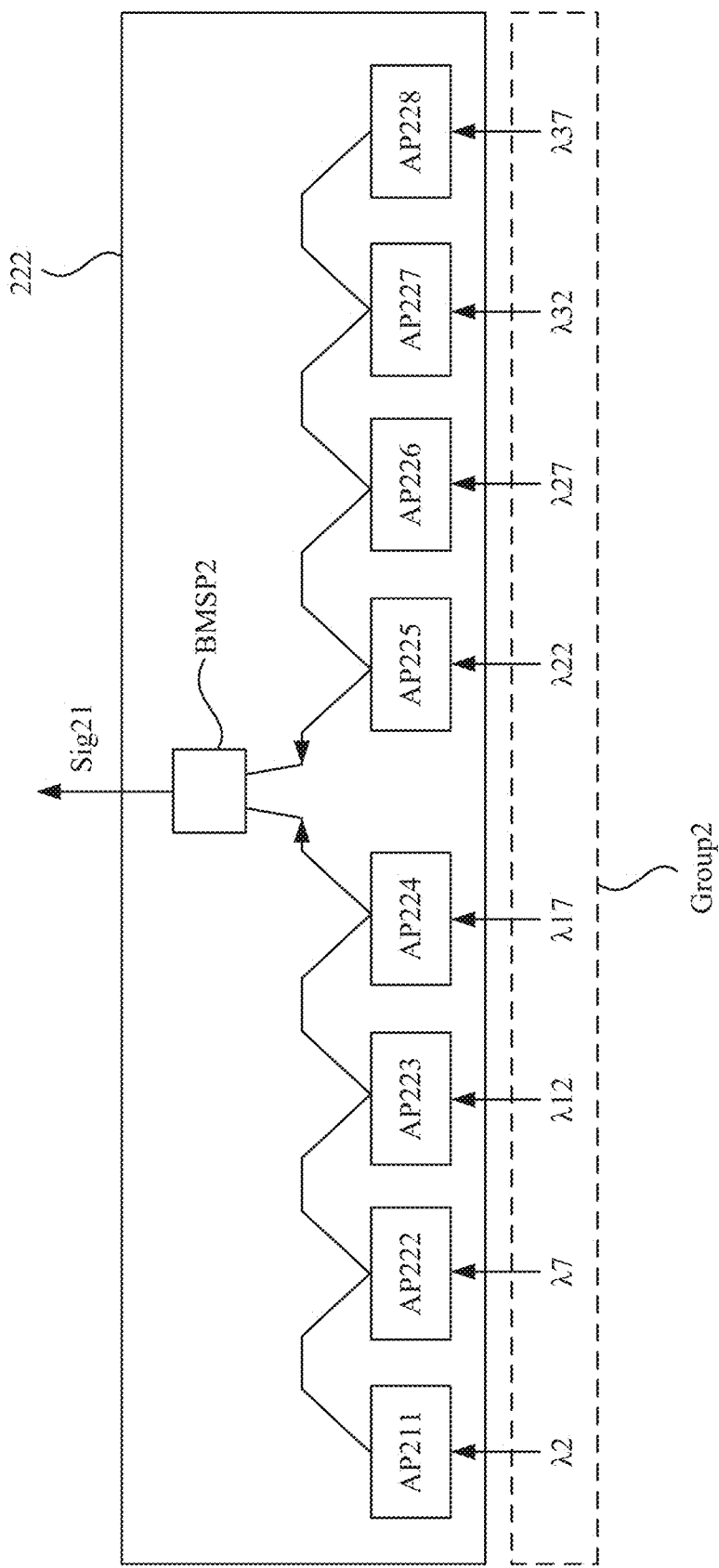
FIG. 6B is a diagram of a multiplexer in accordance with some embodiments of the present disclosure.

Please refer to FIG. 2 and FIG. 6B. FIG. 6B is a diagram of the multiplexer 222 in accordance with some embodiments of the present disclosure. As shown in FIG. 6B, the multiplexer 222 includes eight input ports AP221-AP228 and a splitter BMSP2. Assume that the multiplexer 222 is configured to receive signals of the wavelength group Group2 (i.e., the Group2 in Table 1), then the input port AP221 is configured to receive signal with wavelength A2, the input port AP222 is configured to receive signal with wavelength A7, the input port AP223 is configured to receive signal with wavelength Al2, and so on. As shown in FIG. 6B, when the input ports AP221-AP228 receive the corresponding signals from the Top-of-Rack switch ToR, the input ports AP221-AP228 transmit the signals to the splitter BMSP2, and the splitter BMSP2 combines the signals into the composite optical signal Sig21. The multiplexer 222 then transmits the composite optical signal Sig21 to the first optical signal amplifier ED221 of the OADS 200, as shown in FIG. 2.

Figure 6C:
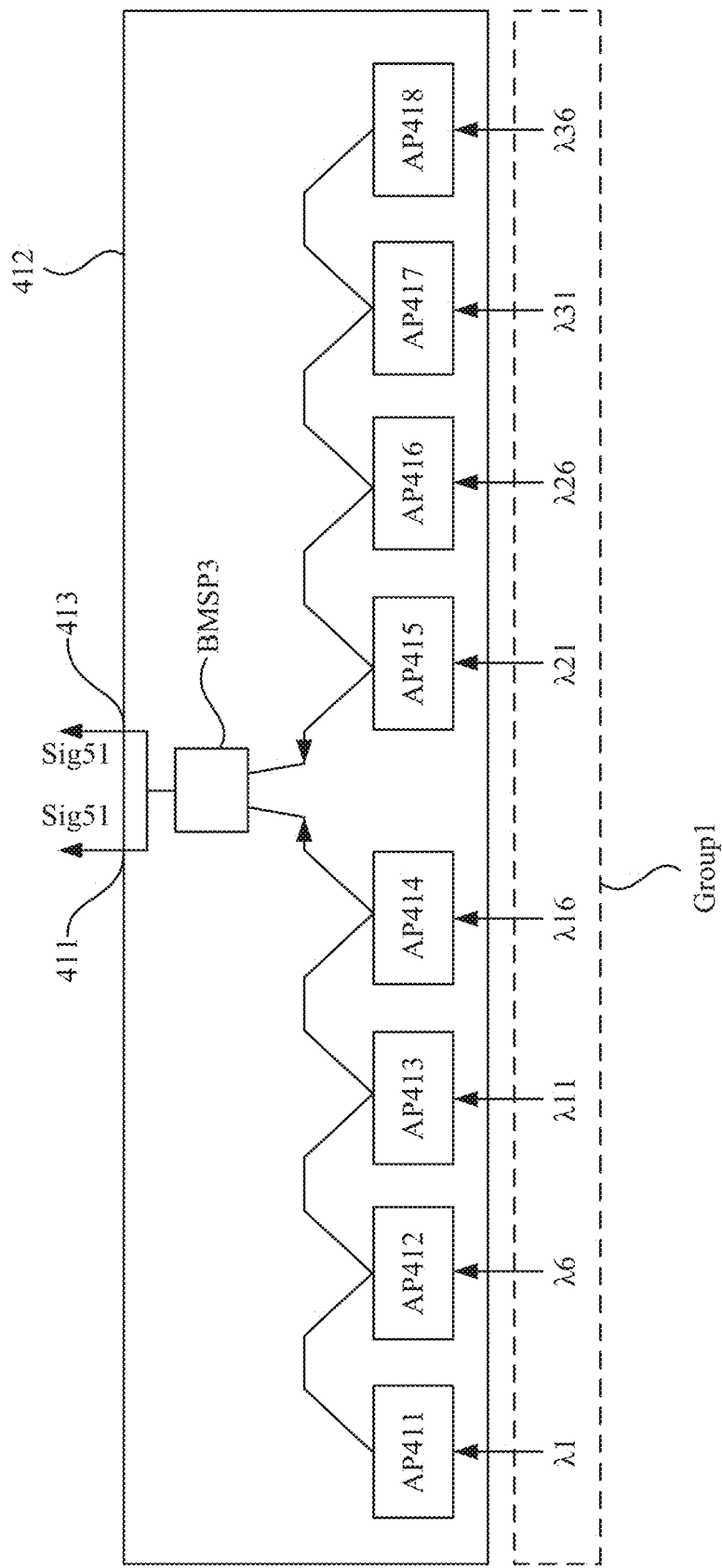
FIG. 6C is a diagram of a multiplexer in accordance with some embodiments of the present disclosure.

Please refer to FIG. 4 and FIG. 6C. FIG. 6C is a diagram of the multiplexer 412 in accordance with some embodiments of the present disclosure. As shown in FIG. 6C, the multiplexer 412 includes eight input ports AP411-AP418 and a splitter BMSP3. Assume that the multiplexer 412 is configured to receive signals of the wavelength group Group1 (i.e., the Group1 in Table 1), then the input port AP411 is configured to receive signal with wavelength A1, the input port AP412 is configured to receive signal with wavelength A6, the input port AP413 is configured to receive signal with wavelength A11, and so on. As shown in FIG. 6C, when the input ports AP411-AP418 receive the corresponding signals from the Top-of-Rack switch ToR, the input ports AP411-AP418 transmit the signals to the splitter BMSP3, and the splitter BMSP3 combine the signals into the composite optical signal Sig51. Then, the first output terminal 411 of the multiplexer 412 transmits the composite optical signal Sig51 to the OSIS 400a, and the second output terminal 413 of the multiplexer 412 transmits the composite optical signal Sig51 to the first splitter SP411, as shown in FIG. 4.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An intelligence-defined optical tunnel network system, comprising:
   a plurality of pods, each one of the pods comprising a plurality of optical add-drop sub-systems, wherein each one of the optical add-drop sub-systems comprises a first transmission module and a second transmission module, the first transmission modules of the optical add-drop sub-systems are connected to each other for forming a first transmission ring, the second transmission modules of the optical add-drop sub-systems are connected to each other for forming a second transmission ring, and each one of the first transmission modules comprises:
      a multiplexer, connected to a Top-of-Rack switch, the multiplexer being configured to receive, through a plurality of input ports, a plurality of upstream optical signals from the Top-of-Rack switch, and combine the upstream optical signals into a composite optical signal, wherein the upstream optical signals have a plurality of wavelengths respectively;
      a first optical signal amplifier, coupled to the multiplexer, the first optical signal amplifier being configured to amplify the composite optical signal and output an amplified composite optical signal;
      a first splitter, disposed on the first transmission ring and coupled to the first optical signal amplifier, the first splitter being configured to receive and duplicate the amplified composite optical signal as a first lateral transmission optical signal and as a first uplink transmission optical signal, transmit the first lateral transmission optical signal through the first transmission ring, and output the first uplink transmission optical signal;
      a first wavelength selective switch, coupled to the first splitter, the first wavelength selective switch being configured to receive the first uplink transmission optical signal from the first splitter and transmit a second uplink transmission optical signal through a first longitudinal port to a first optical switch interconnect sub-system;
      a second wavelength selective switch, disposed on the first transmission ring and coupled to the first splitter, the second wavelength selective switch being configured to receive the first lateral transmission optical signal from the first splitter and output a second lateral transmission optical signal; and
      a second optical signal amplifier, disposed on the first transmission ring and coupled to the second wavelength selective switch, the second optical signal amplifier being configured to receive and amplify the second lateral transmission optical signal and output the amplified second lateral transmission optical signal to the first transmission module of another optical add-drop sub-system in the same pod.

2. The intelligence-defined optical tunnel network system of claim 1, wherein each one of the first transmission modules of the optical add-drop sub-systems is coupled to the first optical switch interconnect sub-system through the first longitudinal port, and each one of the second transmission modules of the optical add-drop sub-systems is coupled to a second optical switch interconnect sub-system adjacent to the first optical switch interconnect sub-system through a second longitudinal port.

3. The intelligence-defined optical tunnel network system of claim 1, wherein each one of the first transmission modules in a first pod of the pods is coupled to the first optical switch interconnect sub-system through the first longitudinal port respectively, and each one of the second transmission modules in a second pod of the pods is coupled to the first optical switch interconnect sub-system through a second longitudinal port.

4. The intelligence-defined optical tunnel network system of claim 1, wherein the first transmission module further comprises:
   a second splitter, disposed on the first transmission ring, the second splitter being configured to receive and duplicate the amplified second lateral transmission optical signal, received from the first transmission module of another optical add-drop sub-system in the same pod, as a first downlink transmission optical signal and as a third lateral transmission optical signal, and transmit the third lateral transmission optical signal to the first splitter;
   a third wavelength selective switch, coupled to the second splitter, the third wavelength selective switch being configured to receive the first downlink transmission optical signal from the second splitter and output a second downlink transmission optical signal;
   a fourth wavelength selective switch, configured to receive a third downlink transmission optical signal from the first optical switch interconnect sub-system and output a fourth downlink transmission optical signal;
   a third splitter, coupled to the third wavelength selective switch and the fourth wavelength selective switch, the third splitter being configured to receive the second downlink transmission optical signal from the third wavelength selective switch, receive the fourth downlink transmission optical signal from the fourth wavelength selective switch, combine the second downlink transmission optical signal and the fourth downlink transmission optical signal as a fifth downlink transmission optical signal, and combine the second downlink transmission optical signal and the fourth downlink transmission optical signal as a sixth downlink transmission optical signal;

a third optical signal amplifier, coupled to the third splitter, the third optical signal amplifier being configured to amplify the fifth downlink transmission optical signal and the sixth downlink transmission optical and output the amplified fifth downlink transmission optical signal and the amplified sixth downlink transmission optical signal; and a demultiplexer, coupled to the third optical signal amplifier and connected to the Top-of-Rack switch, the demultiplexer being configured to receive and demultiplex the amplified fifth downlink transmission optical signal and the amplified sixth downlink transmission optical signal as a plurality of downstream optical signals, and transmit the downstream optical signals to the Top-of-Rack switch.

5. The intelligence-defined optical tunnel network system of claim 1, wherein the multiplexer comprises M input ports, each of which is pre-configured to receive an upstream optical signal that corresponds to a set of N designated wavelengths selected from M*N different wavelengths, where M and N are positive integers.

6. The intelligence-defined optical tunnel network system of claim 1, wherein the first splitter is further configured to receive and duplicate the third lateral transmission optical signal as a fourth lateral transmission optical signal and as a third uplink transmission optical signal, transmit the fourth lateral transmission optical signal through the first transmission ring, and transmit the third uplink transmission optical signal through the first longitudinal port to the first optical switch interconnect sub-system.

7. The intelligence-defined optical tunnel network system of claim 1, wherein an optical transmission direction of the optical add-drop sub-systems in the first transmission ring is opposite to an optical transmission direction of the optical add-drop sub-systems in the second transmission ring.

8. An intelligence-defined optical tunnel network system, comprising:
a plurality of pods, each one of the pods comprising a plurality of optical add-drop sub-systems, wherein each one of the optical add-drop sub-systems comprises a first transmission module and a second transmission module, the first transmission modules of the optical add-drop sub-systems are connected to each other for forming a first transmission ring, the second transmission modules of the optical add-drop sub-systems are connected to each other for forming a second transmission ring, and each one of the first transmission modules comprises:
a multiplexer, connected to a Top-of-Rack switch, the multiplexer being configured to receive, through a plurality of input ports a plurality of upstream optical signals from the Top-of-Rack switch, and combine the upstream optical signals into a composite optical signal, wherein a first output terminal of the multiplexer is configured to transmit the composite optical signal through a first longitudinal port to a first optical switch interconnect sub-system, and a second output terminal of the multiplexer is configured to output the composite optical signal;

a first splitter, disposed on the first transmission ring and coupled to the second output terminal of the multiplexer, the first splitter being configured to receive the composite optical signal from the second output terminal of the multiplexer and transmit a first lateral transmission optical signal through the first transmission ring; and a first optical signal amplifier, disposed on the first transmission ring and coupled to the first splitter, the optical signal amplifier being configured to amplify the first lateral transmission optical signal and output the amplified first lateral transmission optical signal to the first transmission module of another optical add-drop sub-system in the same pod.

9. The intelligence-defined optical tunnel network system of claim 8, wherein each one of the first transmission modules of the optical add-drop sub-systems is coupled to the first optical switch interconnect sub-system through the first longitudinal port, and each one of the second transmission modules of the optical add-drop sub-systems is coupled to a second optical switch interconnect sub-system adjacent to the first optical switch interconnect sub-system through a second longitudinal port.

10. The intelligence-defined optical tunnel network system of claim 8, wherein each one of the first transmission modules of the optical add-drop sub-systems in a first pod of the pods is coupled to the first optical switch interconnect sub-system through the first longitudinal port, and each one of the second transmission modules of the optical add-drop sub-systems in a second pod of the pods is coupled to the first optical switch interconnect sub-system through a second longitudinal port.

11. The intelligence-defined optical tunnel network system of claim 8, wherein the first transmission module further comprises:
a second splitter, disposed on the first transmission ring, the second splitter being configured to receive and duplicate the amplified first lateral transmission optical signal, received from the first transmission module of another optical add-drop sub-system in the same pod, as a first downlink transmission optical signal and as a second lateral transmission optical signal, and transmit the second lateral transmission optical signal through the first transmission ring;
a first wavelength selective switch, coupled to the second splitter, the first wavelength selective switch being configured to receive the first downlink transmission optical signal from the second splitter and output a second downlink transmission optical signal;
a second wavelength selective switch, configured to receive a third downlink transmission optical signal from the first optical switch interconnect sub-system and output a fourth downlink transmission optical signal;
a second optical signal amplifier, coupled to the second wavelength selective switch, the second optical signal amplifier being configured to amplify the fourth downlink transmission optical signal and output the amplified fourth downlink transmission optical signal;
a third splitter, coupled to the first wavelength selective switch and the second optical signal amplifier, the third splitter being configured to receive the second downlink transmission optical signal from the first wavelength selective switch, receive the amplified fourth downlink transmission optical signal from the second optical signal amplifier, combine the second downlink transmission optical signal and the amplified fourth downlink transmission optical signal as a fifth downlink transmission optical signal, and combine the second downlink transmission optical signal and the amplified fourth downlink transmission optical signal as a sixth downlink transmission optical signal; and a demultiplexer, coupled to the third splitter and connected to the Top-of-Rack switch, the demultiplexer being configured to receive and demultiplex the fifth downlink transmission optical signal and the sixth downlink transmission optical signal as a plurality of downstream optical signals, and transmit the downstream optical signals to the Top-of-Rack switch.

12. The intelligence-defined optical tunnel network system of claim 11, wherein the first transmission module further comprises:

a third wavelength selective switch, disposed on the first transmission ring and coupled to the second splitter, the third wavelength selective switch being configured to receive the second lateral transmission optical signal from the second splitter and output a third lateral transmission optical signal to the first splitter.

13. The intelligence-defined optical tunnel network system of claim 12, wherein the first splitter is further configured to receive the third lateral transmission optical signal from the third wavelength selective switch and transmit a fourth lateral transmission optical signal through the first transmission ring.

14. The intelligence-defined optical tunnel network system of claim 8, wherein an optical transmission direction of the optical add-drop sub-systems in the first transmission ring and is opposite to an optical transmission direction of the optical add-drop sub-systems in the second transmission ring.

15. The intelligence-defined optical tunnel network system of claim 8, wherein the multiplexer comprises M input ports, each of which is pre-configured to receive an upstream optical signal that corresponds to a set of N designated wavelengths selected from M*N different wavelengths, where M and N are positive integers.

* * * * *